July 15, 1958 M. G. WEGEFORTH 2,843,722
APPARATUS AND SYSTEM FOR PRODUCING HONEYCOMB CORE
Filed April 2, 1956 15 Sheets-Sheet 1
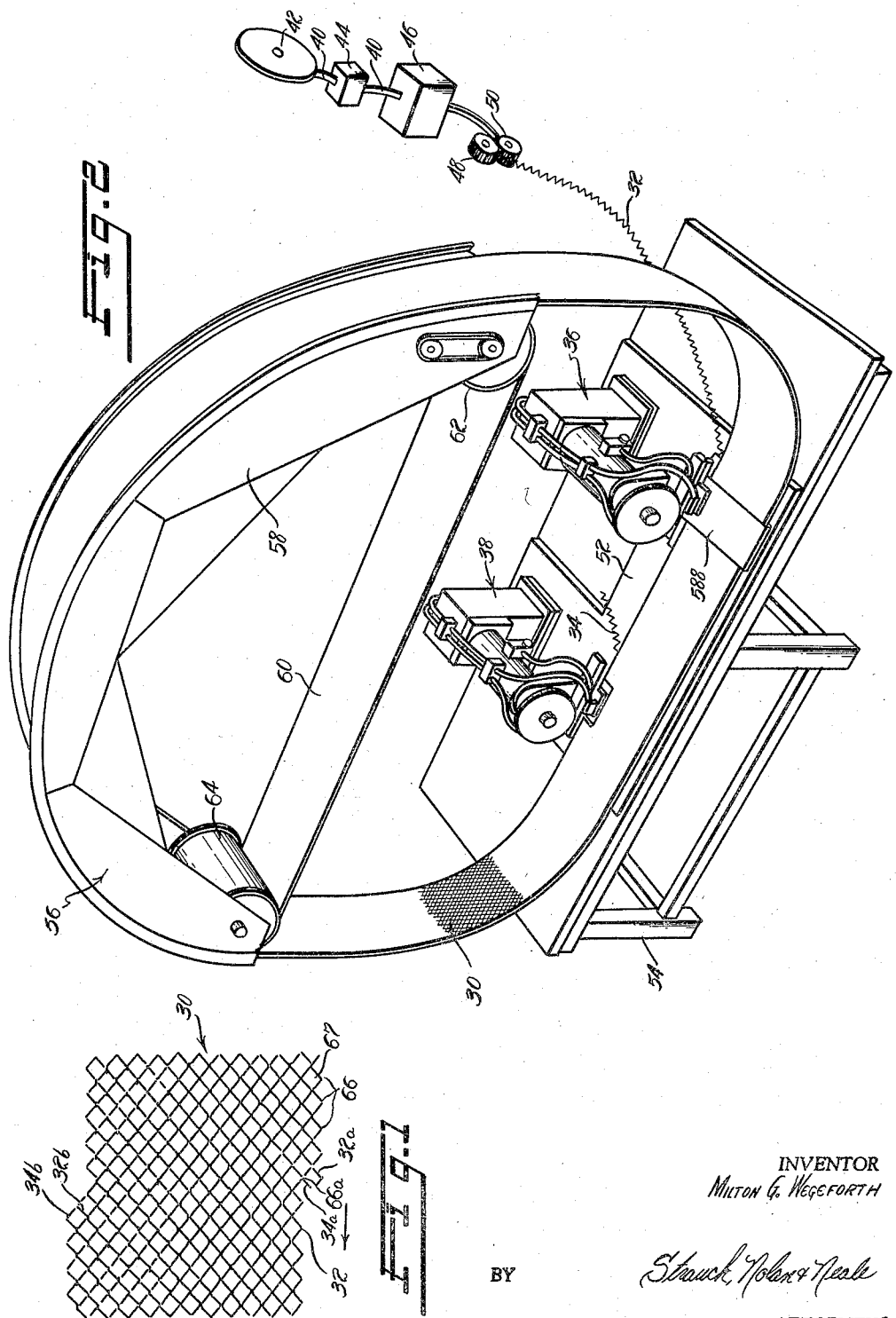
INVENTOR
MILTON G. WEGEFORTH
BY
ATTORNEYS

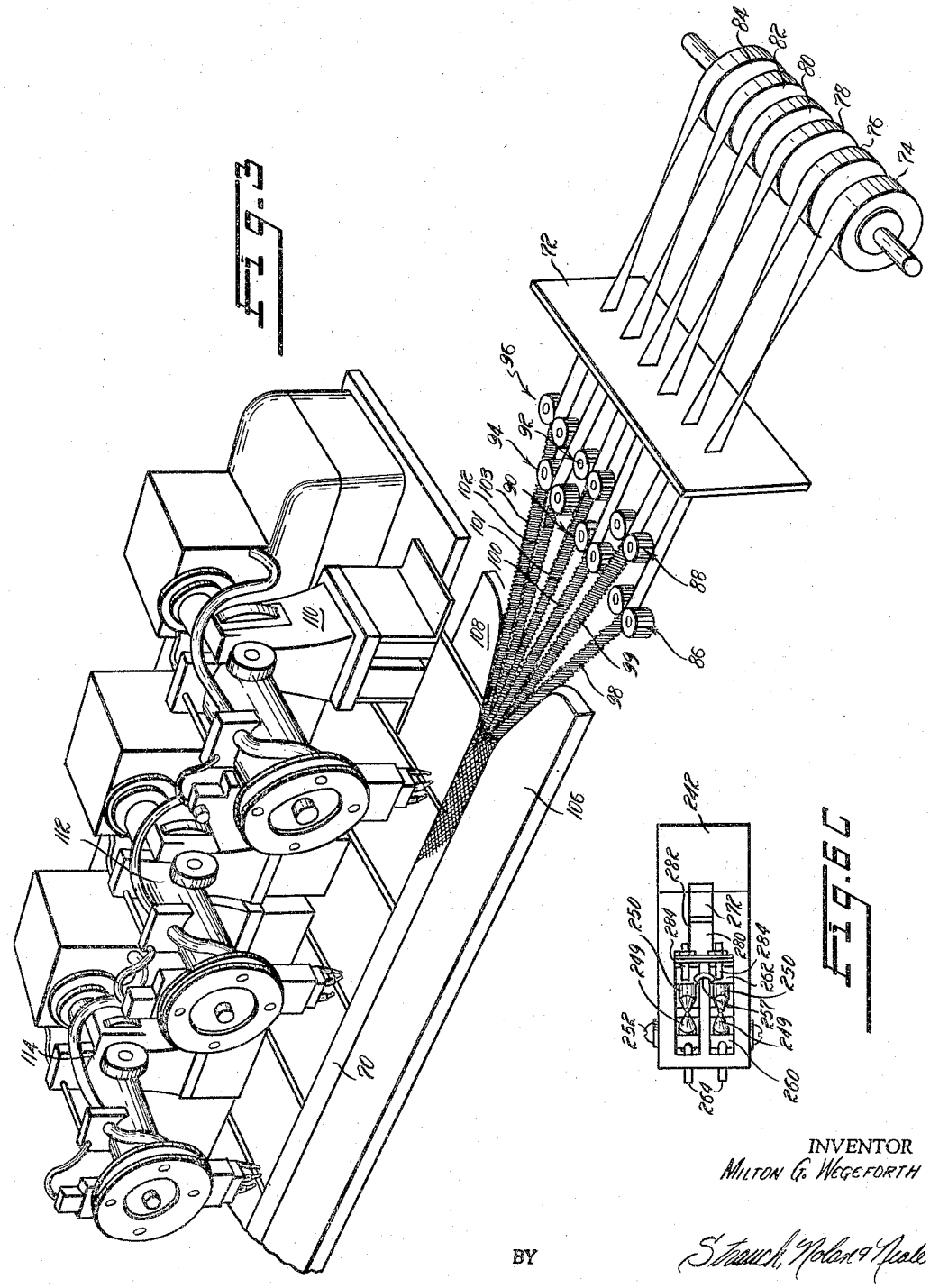

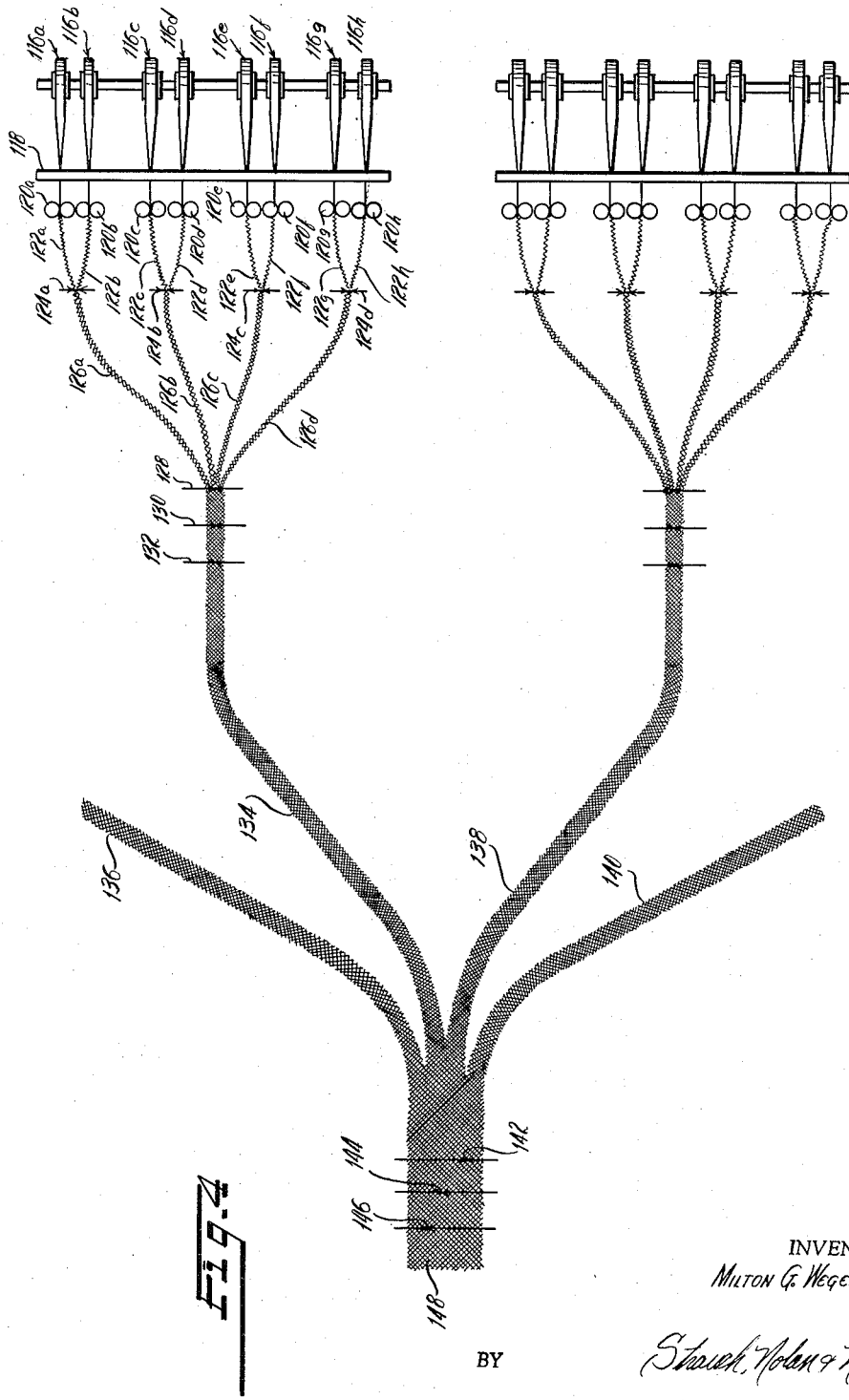

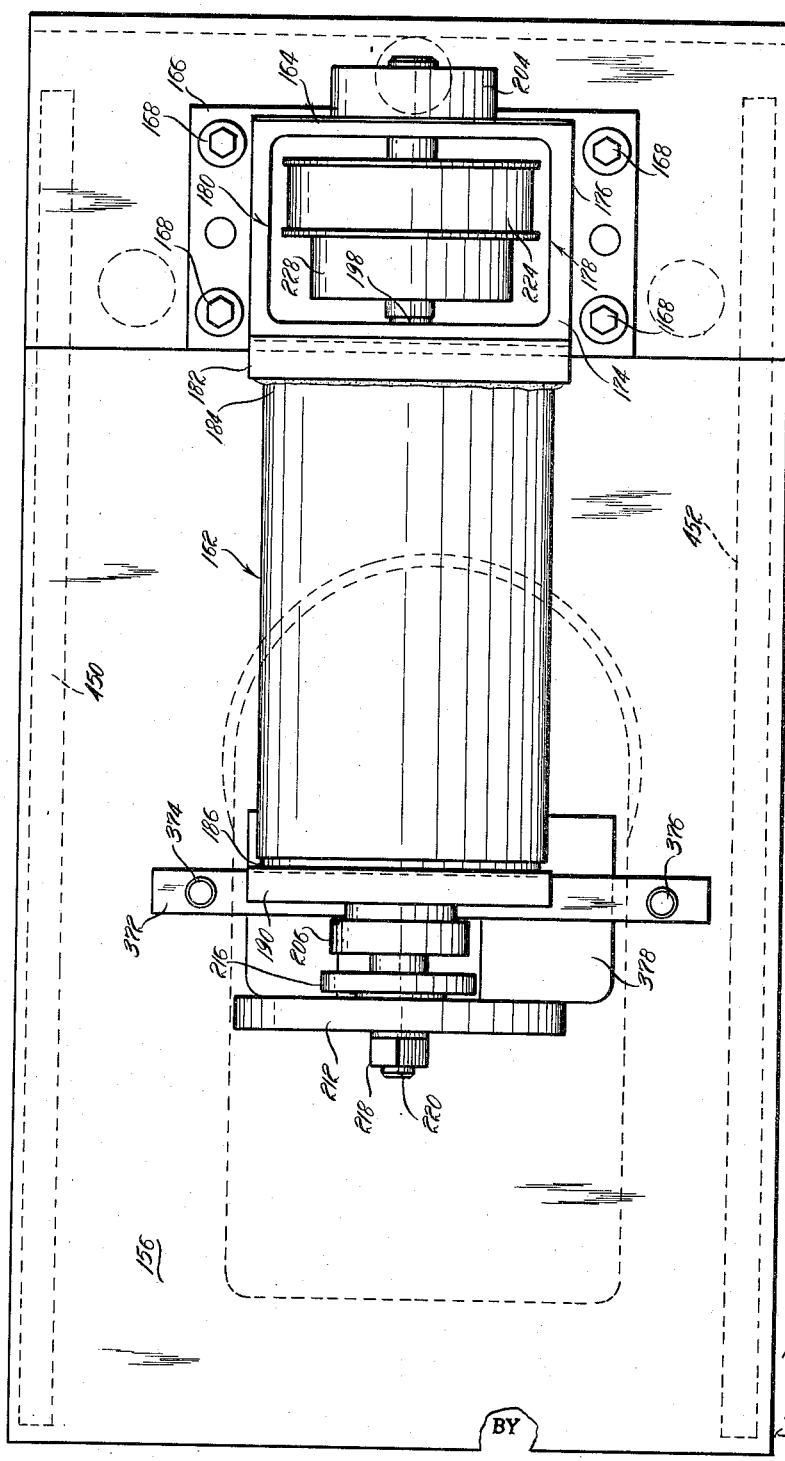

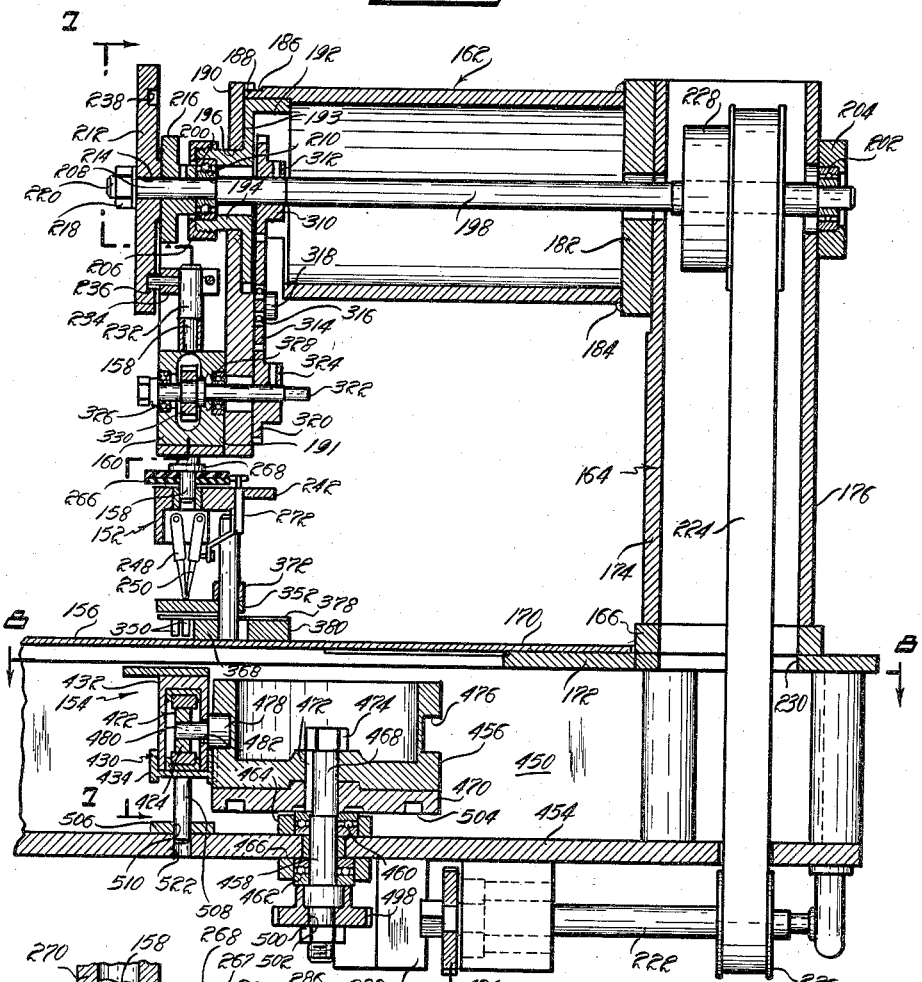

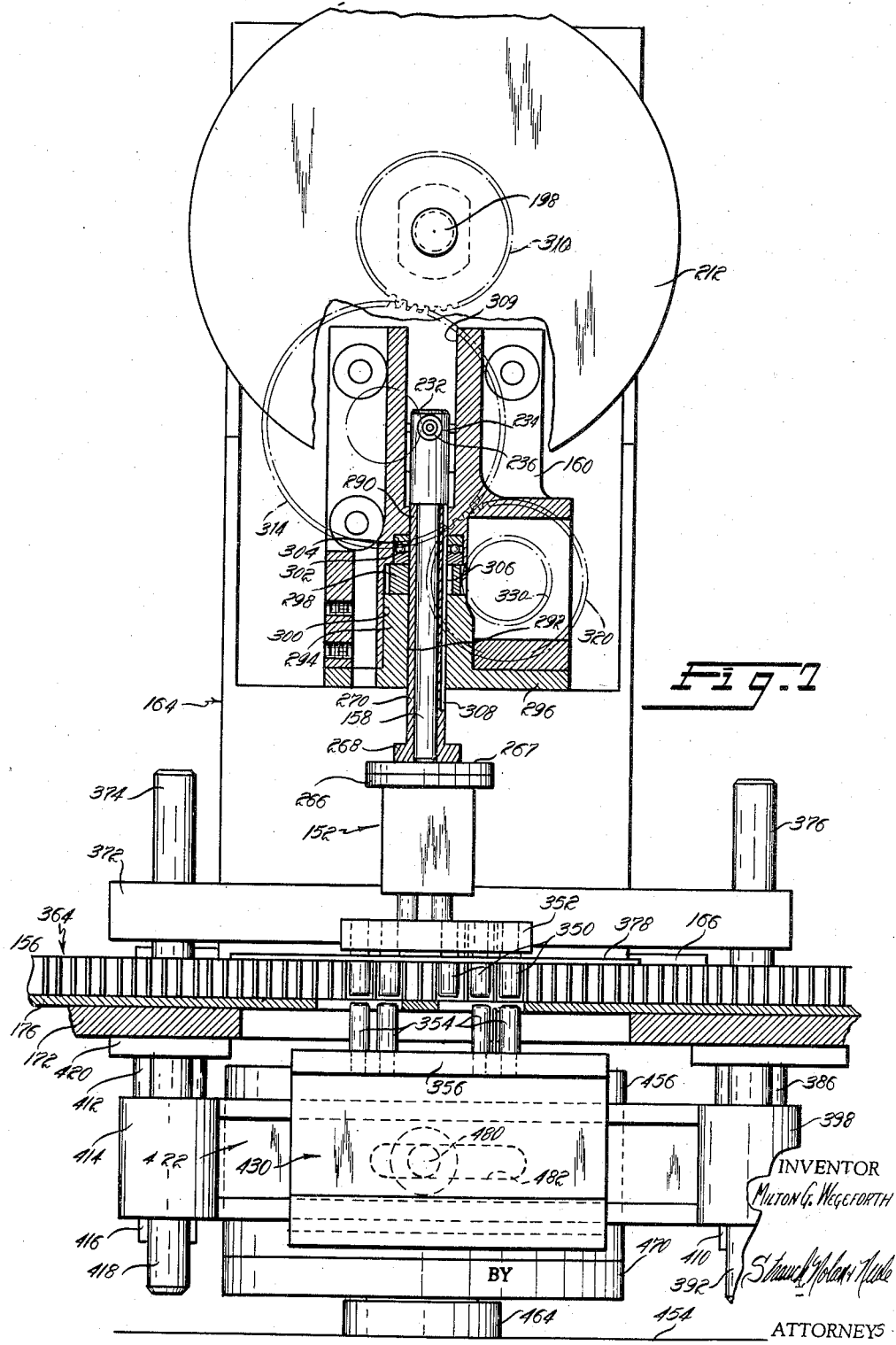

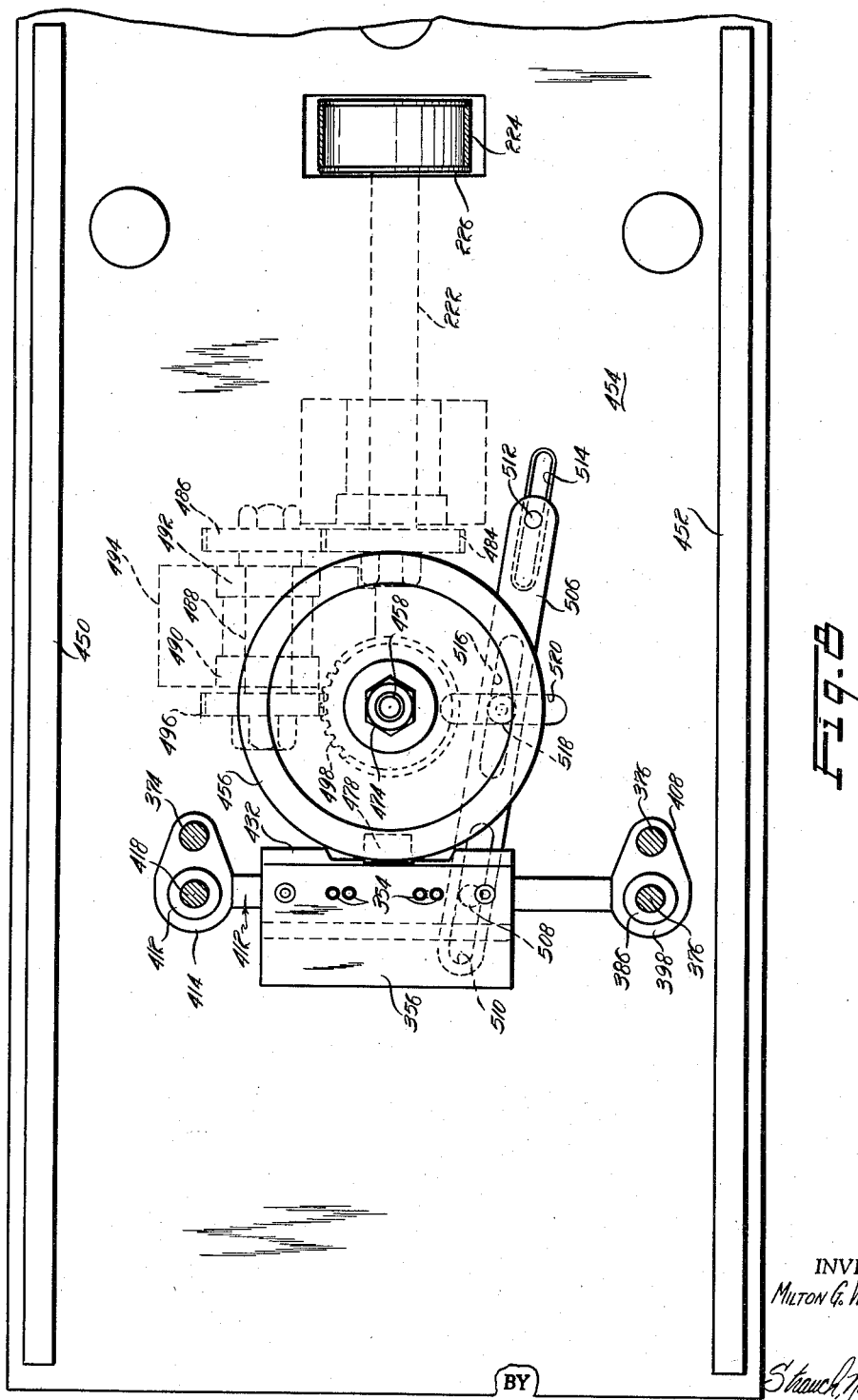

July 15, 1958 M. G. WEGEFORTH 2,843,722
APPARATUS AND SYSTEM FOR PRODUCING HONEYCOMB CORE
Filed April 2, 1956 15 Sheets-Sheet 8
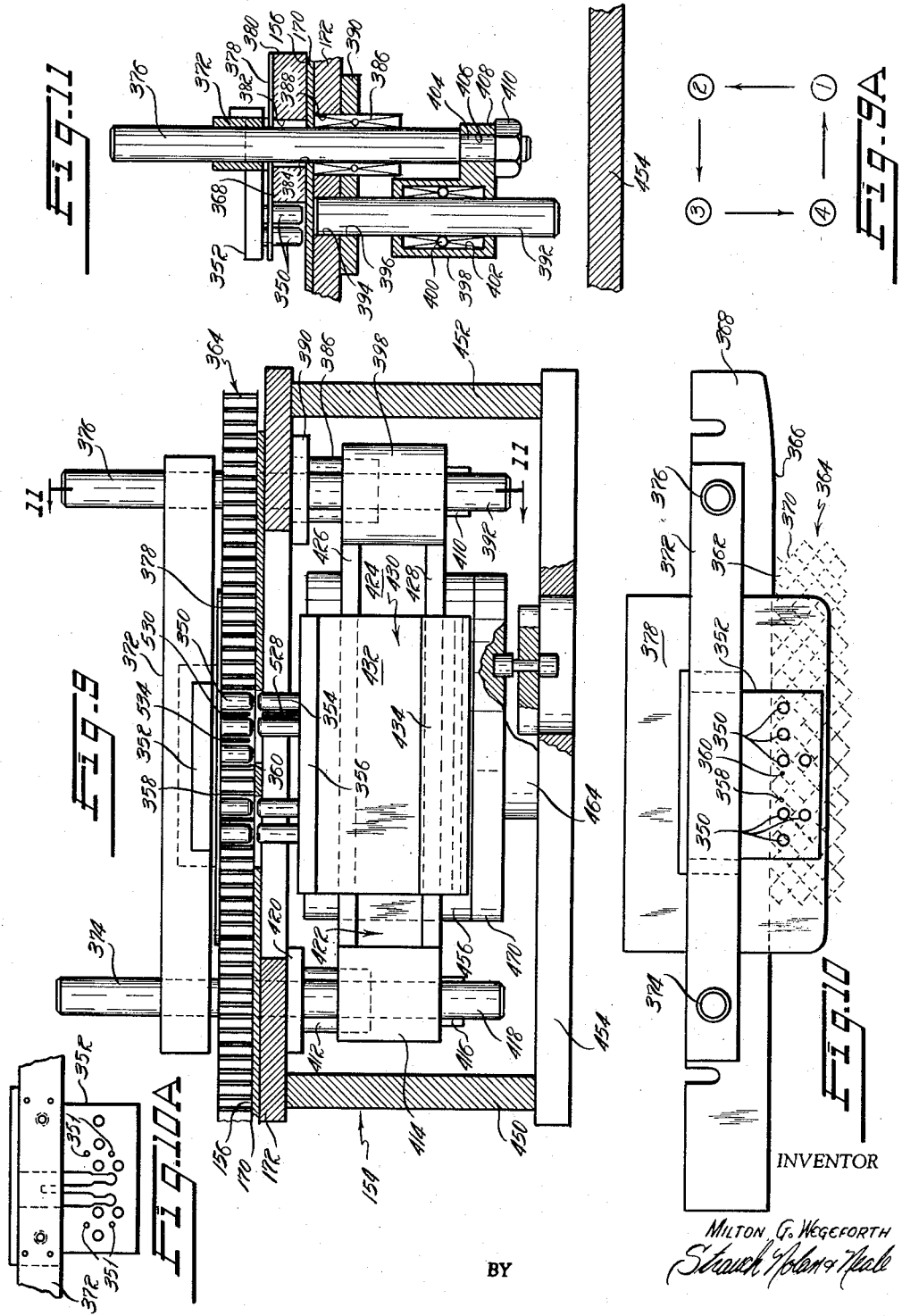

July 15, 1958  M. G. WEGEFORTH  2,843,722
APPARATUS AND SYSTEM FOR PRODUCING HONEYCOMB CORE
Filed April 2, 1956  15 Sheets-Sheet 9
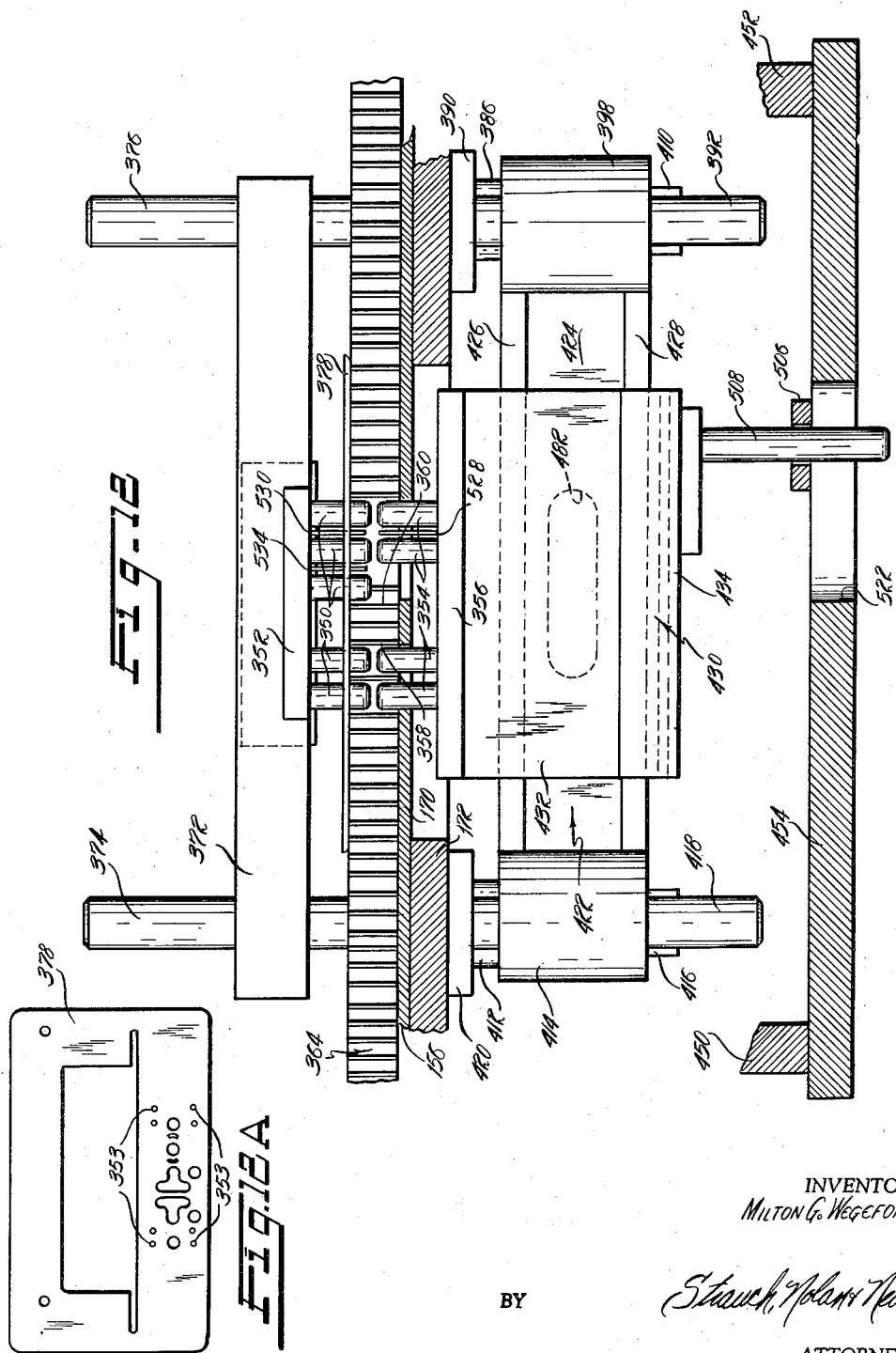
INVENTOR
MILTON G. WEGEFORTH
BY
ATTORNEYS

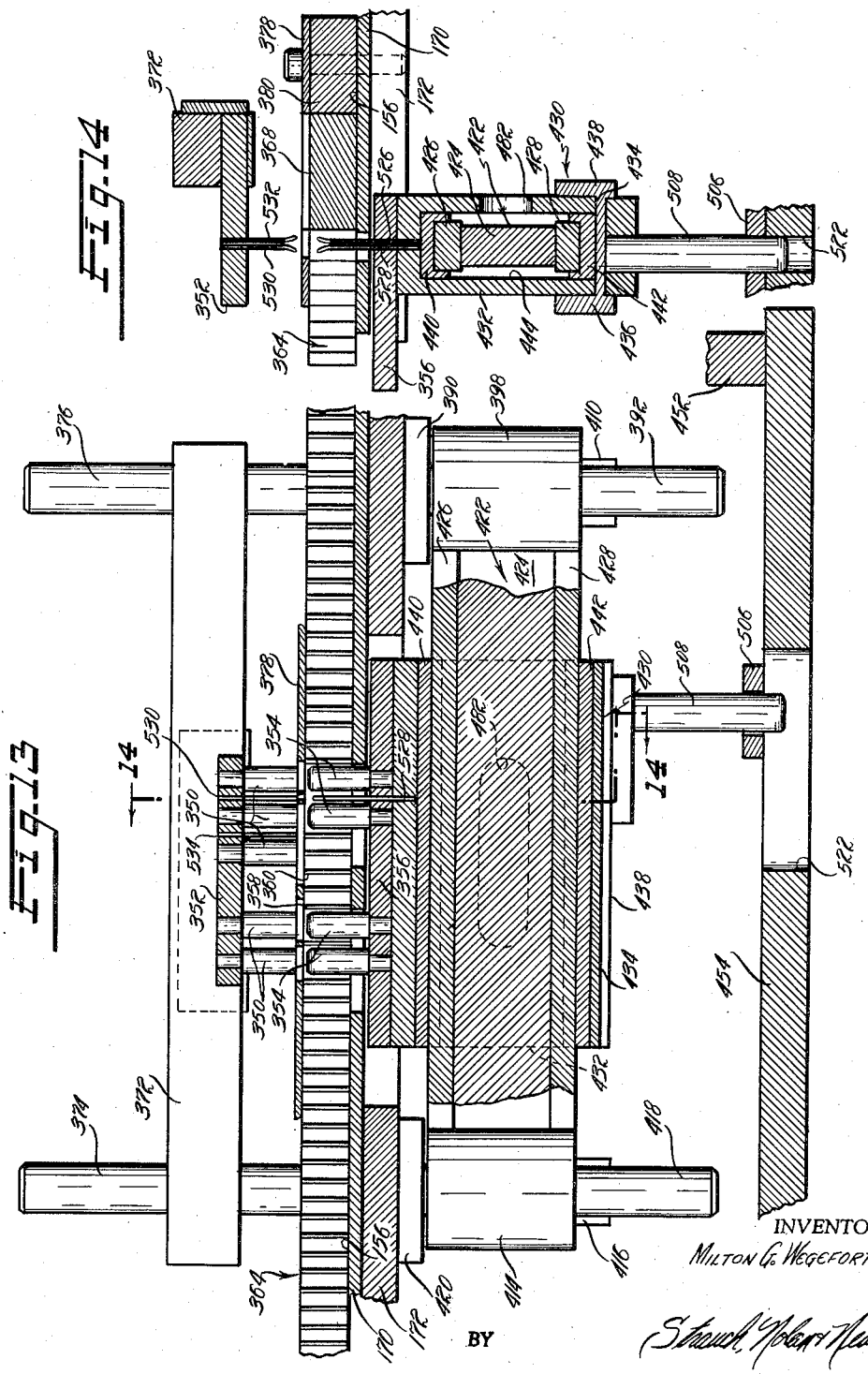

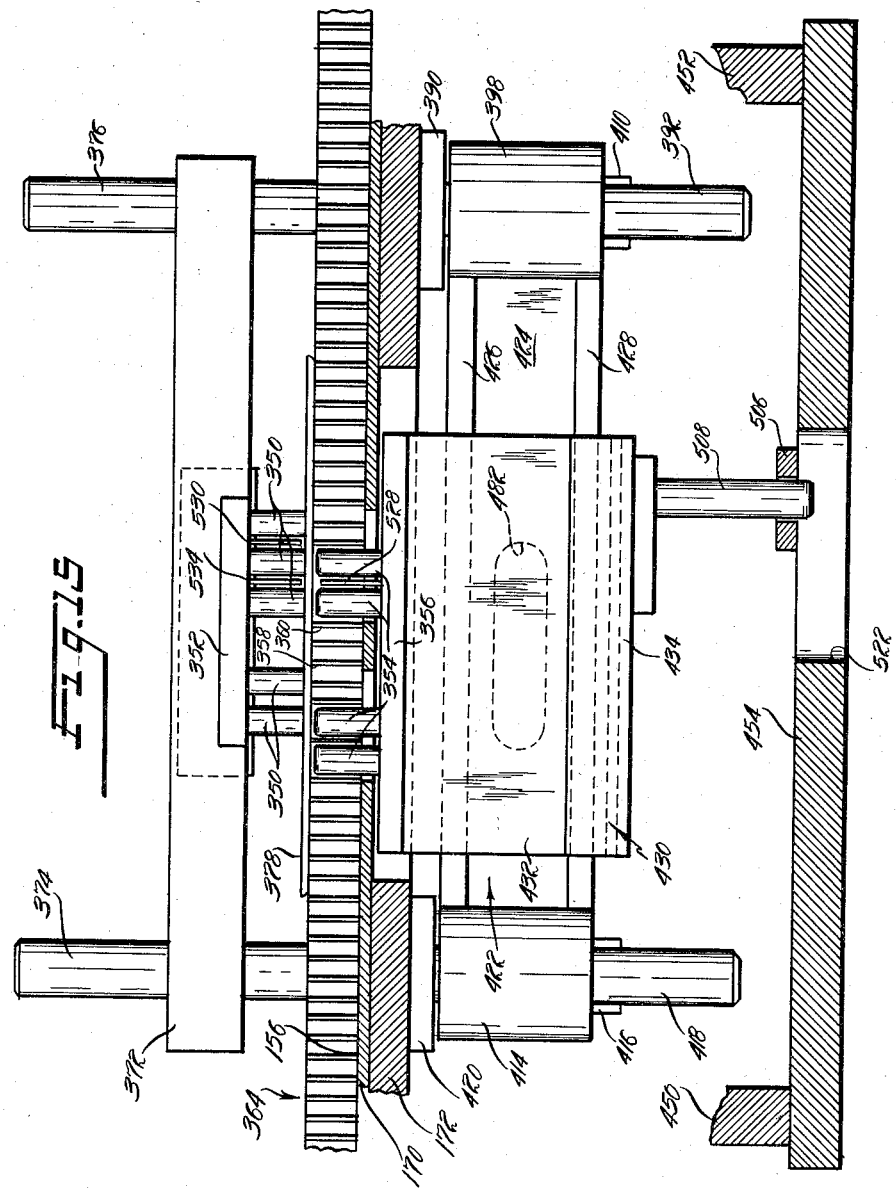

July 15, 1958 M. G. WEGEFORTH 2,843,722
APPARATUS AND SYSTEM FOR PRODUCING HONEYCOMB CORE
Filed April 2, 1956 15 Sheets-Sheet 12
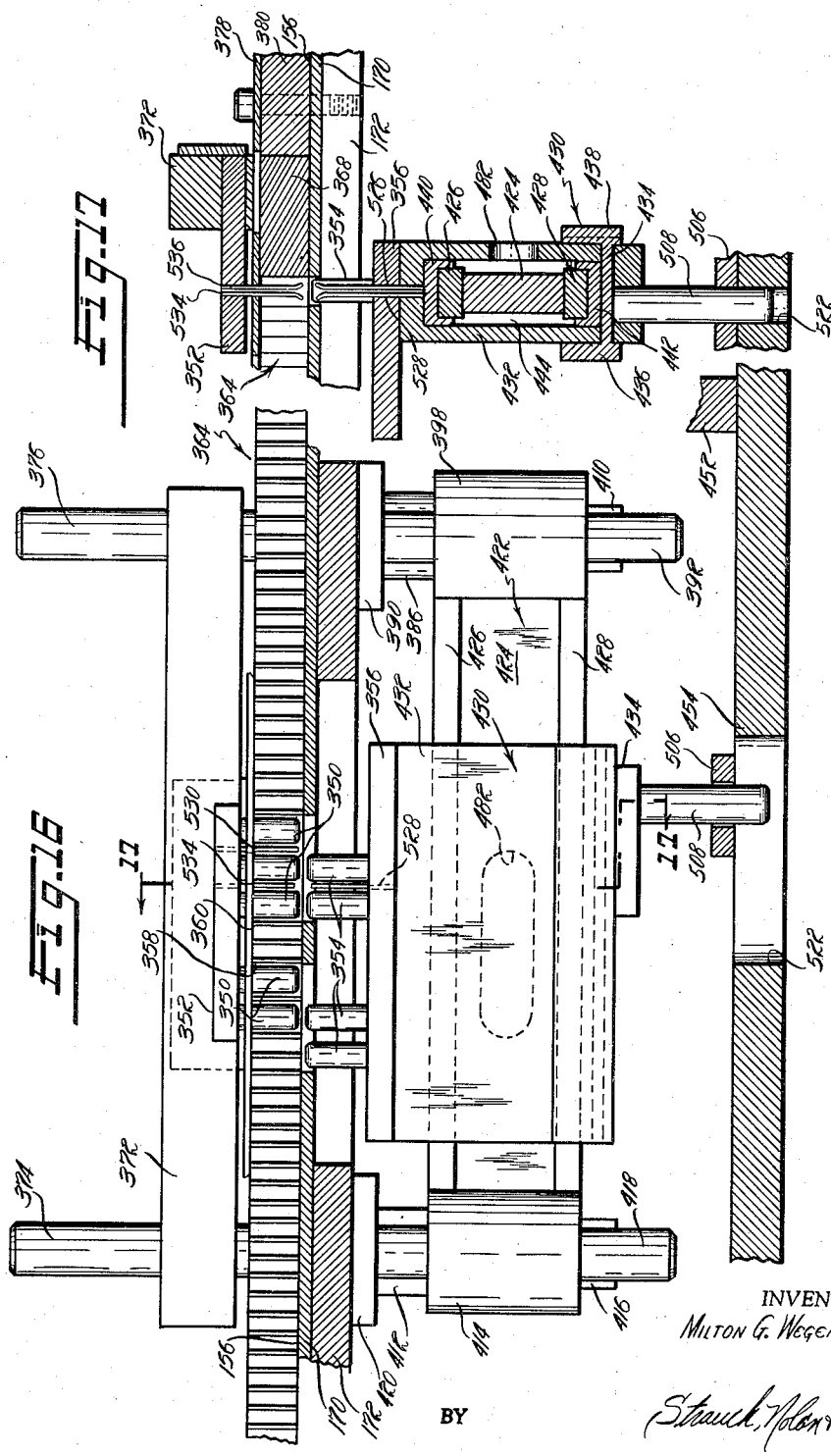
INVENTOR
MILTON G. WEGEFORTH
ATTORNEYS

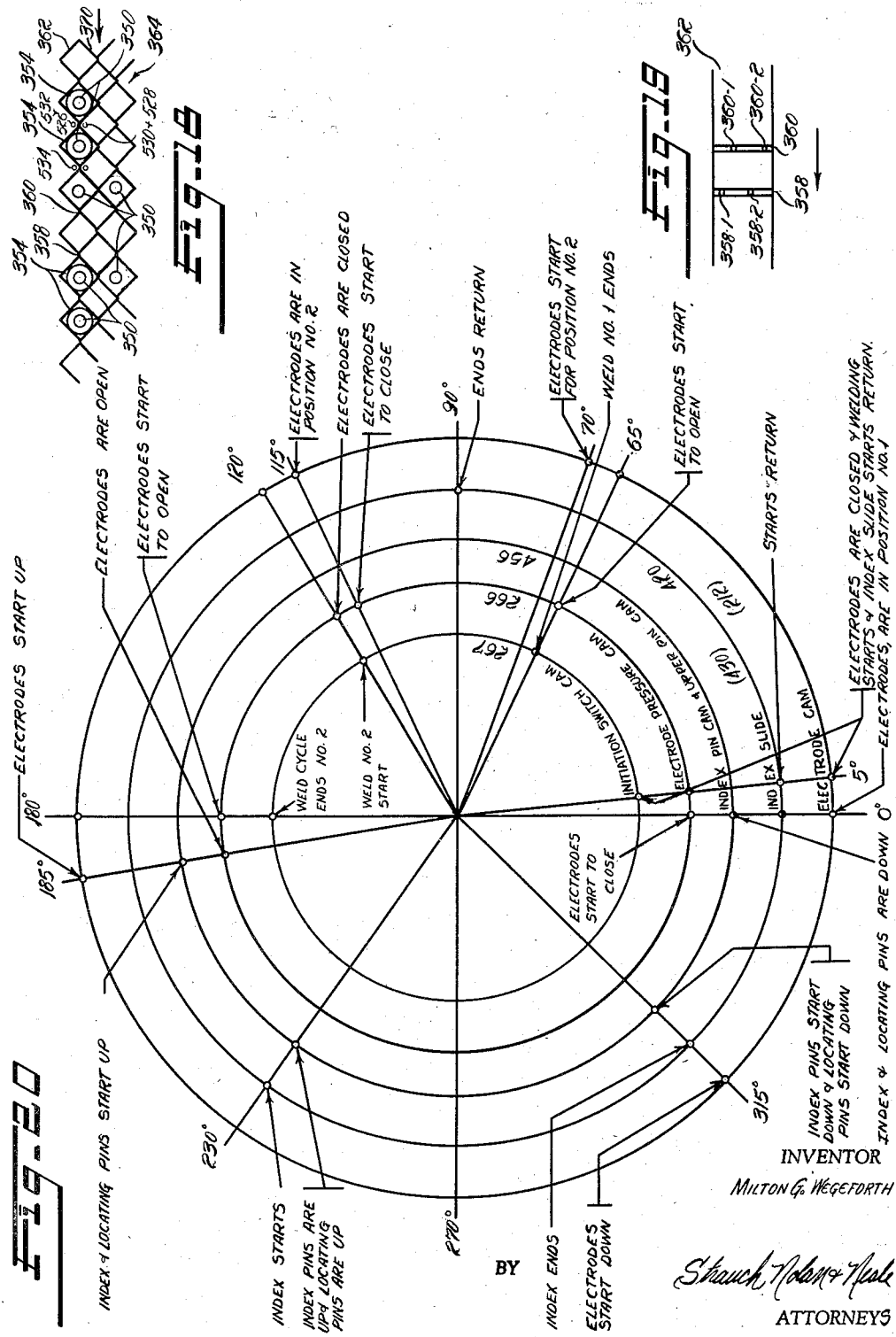

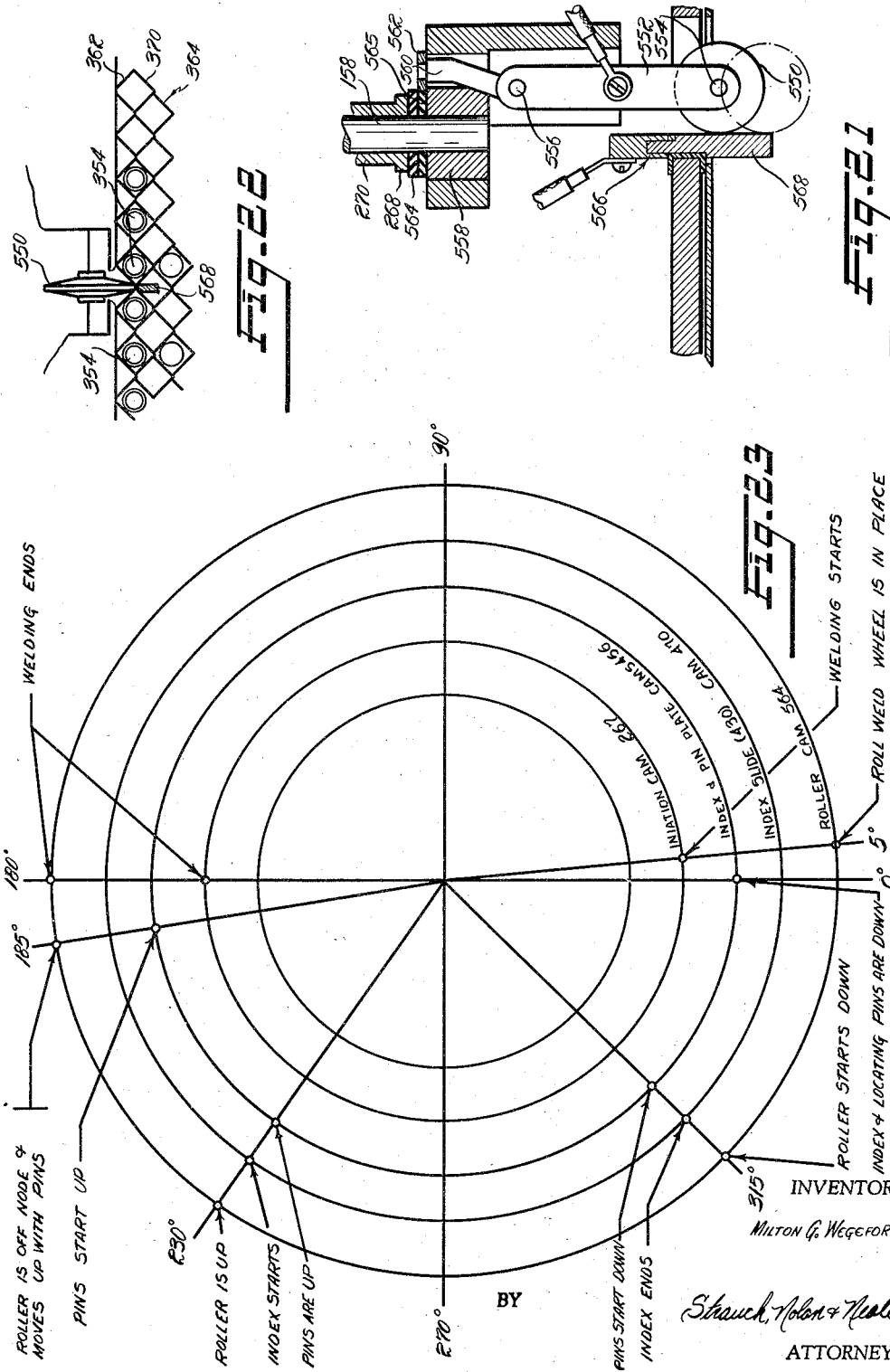

July 15, 1958   M. G. WEGEFORTH   2,843,722
APPARATUS AND SYSTEM FOR PRODUCING HONEYCOMB CORE
Filed April 2, 1956   15 Sheets-Sheet 15
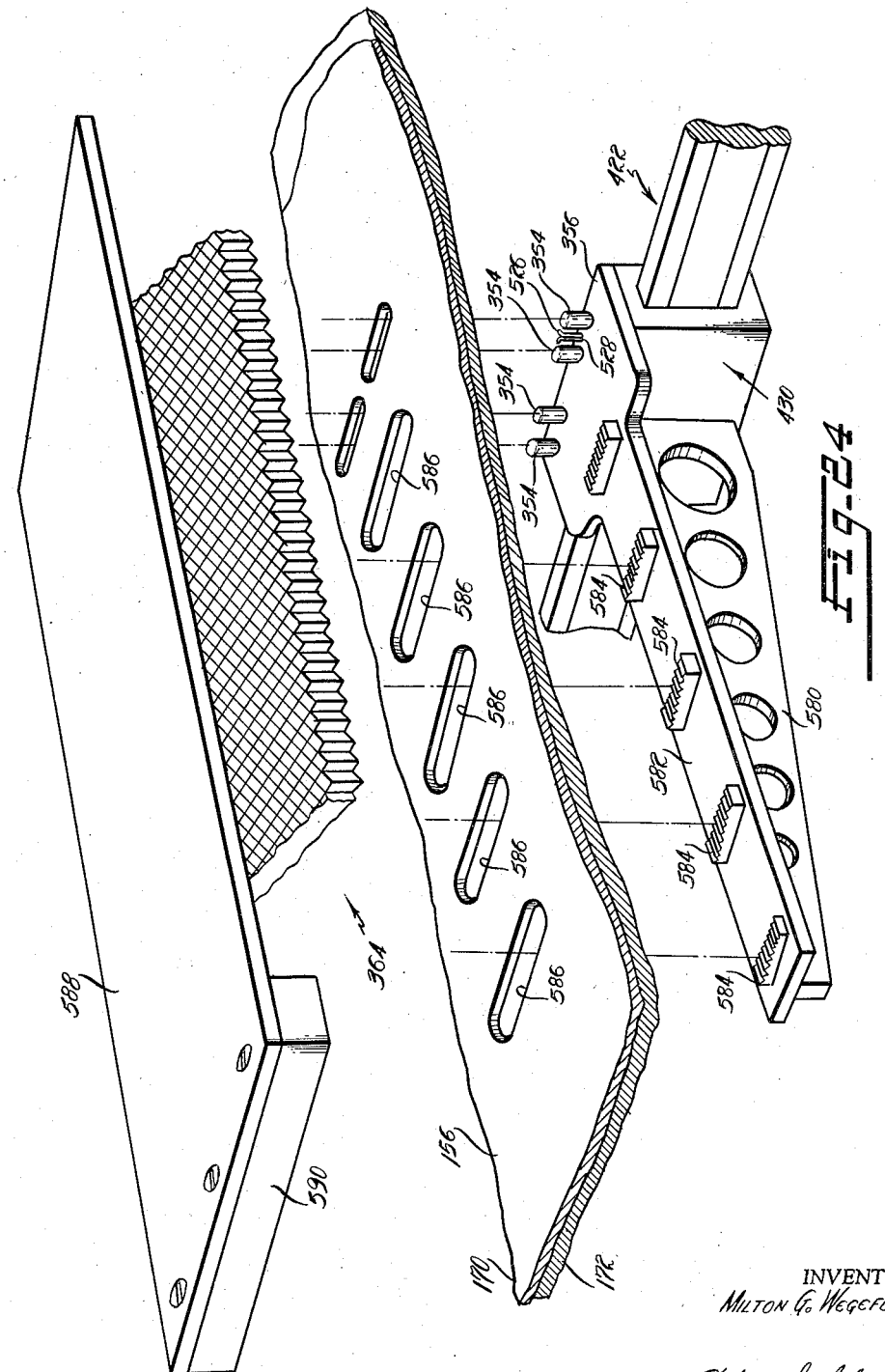
INVENTOR
MILTON G. WEGEFORTH
BY
ATTORNEYS

United States Patent Office 2,843,722
Patented July 15, 1958

2,843,722

APPARATUS AND SYSTEM FOR PRODUCING HONEYCOMB CORE

Milton G. Wegeforth, San Diego, Calif., assignor to Solar Aircraft Company, San Diego, Calif., a corporation of California Application April 2, 1956, Serial No. 575,513

43 Claims. (Cl. 219—80)

The present invention relates generally to what is known in the art as honeycomb core, more particularly to all-metal honeycomb core, and specifically to methods and means for the fabrication of such core.

All-metal honeycomb core is the accepted nomenclature for a metallic body having multiple cellular structure with the cells of generally uniform pattern, and the metal strips defining the cell areas being of generally uniform thickness and width.

While, to the general public, honeycomb creates the picture of hexagonal cell structure, in the trade the word implies multiple cell structure with the cells of any of a variety of shapes, such as triangular, square, pentagonal, etc. Further, cell walls may be of any desired width and in thickness may range from .001″ to any realistic figure such as .25″.

However, for practical considerations, the present invention contemplates the rapid, accurate, and comparatively inexpensive fabrication of all-metal honeycomb core from steel ribbons of from .001″ to .020″ thickness with widths from $\frac{1}{16}$″ to 12″, formed in the desired configurations and attached at the nodes by resistance welding, either spotweld or rollweld, as will be fully detailed infra.

The demand for the type of all-metal honeycomb core under discussion, for applications especially in the aircraft industry where light weight, high strength structure is essential, has far outstripped the supply. Where comparatively low service temperatures, say below 300° F. are to be encountered, a core of metal bonded with resins or plastics may be useful, but for temperatures above 300° F. the all-metal structure is required, and prior art all-metal core fabrication of my knowledge is achieved only by slow, laborious, and costly manual operations with production limited to a maximum of a few square feet per work day.

The principal objects of the present invention are to provide:

(1) A device which can be used, singly or with other similar devices, to rapidly and economically fabricate honeycomb core structures from corrugated ribbons;

(2) A method of fabricating honeycomb core structure in which corrugated ribbon is conveyed through successive work stations in oppositely corrugated pairs and in which bonding of the nodes of the opposite side of each corrugated ribbon to an adjacent corrugated ribbon takes place in a distinct work station to provide a substantially continuous flow of such ribbons and the resulting honeycomb core structure throughout the fabricating process;

(3) A machine and method for fabricating honeycomb core structure in the form of an endless belt;

(4) A machine and method for fabricating honeycomb core structure in the form of a sheet;

(5) Machines and systems for fabricating honeycomb core structure in the form of a sheet of any desired length and width;

(6) A honeycomb core fabricating machine adapted to bond together adjacent abutting nodes of oppositely corrugated ribbon;

(7) A honeycomb core fabricating machine adapted to bond together adjacent abutting nodes of oppositely corrugated ribbons by resistance welding;

(8) A honeycomb core fabricating machine adapted to bond together adjacent abutting nodes of oppositely corrugated metallic ribbons by spot resistance welding;

(9) A honeycomb core fabricating machine adapted to bond together adjacent abutting nodes of oppositely corrugated metallic ribbons by a roll resistance welding;

(10) A honeycomb core fabricating machine adapted to bond, to the exterior nodes of the exterior corrugated ribbon or a partially formed honeycomb core structure, the nodes of an oppositely corrugated ribbon;

(11) A feed mechanism adapted to advance corrugated ribbon and/or honeycomb core structure through a work station without distortion thereof;

(12) A feed mechanism adapted to intermittently advance corrugated ribbon and/or honeycomb core structure through a work station without distortion thereof whereby work can be performed upon said ribbon and/or core structure while stationary at said work station;

(13) A feed mechanism adapted to intermittently advance corrugated ribbon and/or honeycomb core structure through a work station embodying cooperating holding and indexing pins adapted to be received within the cells defined by the corrugations of such ribbon and/or core structure to provide guide and support therefor and effect the intermittent movement thereof;

(14) A machine for fabricating honeycomb core structure embodying a cyclically operative bonding tool at a work station and an intermittently operative feed mechanism adapted to intermittently advance corrugated ribbon and/or honeycomb core structure through such work station in timed relation to the operation of the bonding tool; and

(15) A device for and method of fabricating honeycomb core structure from strips of ribbon.

These and other objects of the present invention will become more fully apparent by reference to the appended claims and as the following detailed description of the invention proceeds in reference to the accompanying drawings wherein:

Figure 1 is a fragmentary plan view of a section of honeycomb core constructure in accordance with the present invention;

Figure 2 is a perspective view of one form of honeycomb core fabricating apparatus adapted to produce a continuous belt of honeycomb core;

Figure 3 is a perspective view illustrating a second embodiment of the present invention adapted to produce a panel of honeycomb core of indeterminate length;

Figure 4 is a diagrammatic view illustrating an embodiment of the invention, similar to that illustrated in Figure 3, and adapted to produce a plurality of panels of honeycomb core to be joined into a wider panel of honeycomb core all of indeterminate length;

Figure 5 is a top plan view of the honeycomb core bonding machine of the present invention adapted for use in each of the embodiments shown in Figures 2 through 4;

Figure 6 is a vertical sectional view of the machine of Figure 5 taken substantially through the longitudinal center line of the machine;

Figure 6A is an enlarged fragmentary sectional view of the welding head of the machine of Figure 6;

Figure 6B is a front view of the welding head;

Figure 6C is a bottom view of the welding head;

Figure 7 is a front end view of the machine of Figure 5 partially in section taken along the line 7—7 of Figure 6;

Figure 8 is a horizontal sectional view of the machine of Figure 5 showing the mechanism beneath the base thereof and taken substantially along the line 8—8 of Figure 6;

Figure 9 is a fragmentary partially section front view of the feed mechanism of the machine of Figure 5, the feed mechanism being shown in its configuration at position 1;

Figure 9A is a diagram illustrating the four positions of the feed mechanism and its direction of movement between such positions;

Figure 10 is a fragmentary plan view of the mechanism of Figure 9;

Figure 10A is a fragmentary plan view showing the details of the holding pin mounting plate and its support;

Figure 11 is a fragmentary sectional view taken along the line 11—11 of Figure 9;

Figure 12 is a view similar to Figure 9 showing the construction of the feed mechanism when moving between positions 1 and 2;

Figure 12A is a plan view of the feed mechanism stripper plate located directly over the top of core as shown at 378, Figure 12;

Figure 13 is a view similar to Figure 9 showing the construction of the feed mechanism when in position 2;

Figure 14 is a fragmentary sectional view taken substantially along the line 14—14 of Figure 13;

Figure 15 is a view similar to Figure 9 illustrating the configuration of the feed mechanism in position 3;

Figure 16 is a view similar to Figure 9 illustrating the configuration of the feed mechanism in position 4;

Figure 17 is a fragmentary sectional view taken substantially along the line 17—17 of Figure 16;

Figure 18 is a fragmentary diagrammatic view illustrating the relationship between the position of the welding electrodes, the indexing pins and the honeycomb core structure being assembled. The large circles in the cells indicate the pins in the indexing pin plate and the small circles indicate the location of pins in the upper pin plate at the time the indexing mechanism is in position 2 (Figure 9A) before indexing occurs.

Figure 19 is a fragmentary view illustrating the vertical relationship between the points of spot welding of the honeycomb core structure as viewed from the side of the honeycomb core structure. This shows the spots which are made in one complete cycle of the machine being described;

Figure 20 is a timing chart for the machine illustrated in Figures 5 through 19;

Figure 21 is a fragmentary view illustrating a further embodiment of the machine of Figure 5 in which a roller electrode has been substituted for the spot welding electrodes;

Figure 22 is a fragmentary view similar to Figure 18 illustrating the relationship between the roller electrode, the indexing pins and the honeycomb core structure being assembled;

Figure 23 is a timing chart for the machine as illustrated in Figures 21 and 22 for the use of the roller electrode; and Figure 24 is an exploded fragmentary view of a modified form of the feed mechanism adapted to feed wide sections of honeycomb core structure.

Referring now to the drawings and particularly to Figure 1, there is therein illustrated a fragmentary view of a honeycomb structure of the type resulting from the operation of the machine illustrated generally in Figure 2. In the device shown in Figure 2, the honeycomb structure is initially fabricated in the form of an endless belt or web 30 from two strips of corrugated ribbon 32 and 34 by welding devices 36 and 38. Uniformly corrugated ribbon 32 is formed from a smooth metal ribbon 40 from a supply reel 42 mounted for free rotation upon a suitable support not shown. The ribbon 40 is fed through a splice unit 44 adapted to bond the end of a ribbon 40 from an exhausted supply reel 42 to the end of ribbon 40 from a new supply reel 42. From the splice unit 44, the ribbon 40 is fed through a degreaser unit 46 and thence to a pair of motor driven meshing corrugating rolls 48 and 50 by which it is converted into the uniformly corrugated ribbon 32. A similar mechanism is provided for supplying, degreasing and corrugating the corrugated ribbon 34.

The welding units 36 and 38 are each of the type shown in detail in Figures 5 through 20 and are mounted upon a suitable support plate 52 over which the honeycomb core or belt 30 is advanced. The plate 30 is mounted on a suitable support table 54.

The honeycomb structure endless belt 30, upon leaving the table 52, advances upwardly over an arcuate conveyor 56 from whence it is returned to the opposite end of the table 52. The conveyor 56 consists of an arcuate support 58 over which a conveyor belt 60 is continuously advanced by a motor driven belt drive roller 62 and an idler roller 64. The conveyor 56 is mounted above the path of the honeycomb structure 30 along the table 52, by suitable means not shown, to properly guide the belt 30.

In initiating the fabrication of a honeycomb belt 30, corrugated ribbons 32 and 34 are aligned such that the ribbons 32 and 34 are oppositely corrugated, that is so that the nodes 66 of the adjacent sides of ribbons 32 and 34 are in alignment transversely and in abutting juxtaposition and the spaces between the abutting nodes 66 define hollow cells 67. With the corrugated ribbons 32 and 34 in alignment in this manner, they are placed in position beneath the path of movement of the welding head of the welding unit 38 and the first pair of abutting nodes 66 of the ribbons 32 and 34 are welded together. The ribbons 32 and 34 are advanced intermittently in alignment by a feed mechanism, of the type illustrated in Figure 7, and the successive pairs of abutting nodes 66 of the ribbons 32 and 34 are welded as the ribbons are advanced through the work station of the welding unit 38. When the length over which the ribbons 32 and 34 are bonded together in this manner is sufficient to extend from the welding unit 38 over the conveyor 56 back to the welding unit 36, the first node on the rear side of the ribbon 34 is aligned with and bonded to an abutting node 66a on the corrugated ribbon 32 by the welding unit 36 and the welding unit 36 is operative to weld the successive abutting nodes 66 of the corrugated ribbon 32 to the corresponding nodes 66 of the portion of the corrugated ribbon 34 the other side of which was bonded to the leading edge portion of the corrugated ribbon 32. In this manner a continuous belt has been formed. The belt 30 is advanced by the conveyor 56 and the intermittently operative feed mechanism of the welding units 36 and 38 to bond corrugated ribbon 32 to the outside edge of the belt 30 received from the conveyor 56 and to bond corrugated ribbon 34 to the outside edge of the corrugated ribbon 32 which has just been joined by unit 36 to the plate 30. The device continues to operate until the width of the plate 30 has reached the desired magnitude. The only limits upon the width of the honeycomb core structure which can be fabricated in this manner are the practical width of the conveyor 56 and the work support surface 52. The length of the plate 30 is varied by varying the length of strip initially formed by unit 38 before bonding by unit 36 is initiated.

After the desired width of plate 30 has been reached, corrugated ribbon 32 is cut off from its supply and the belt 30 advanced until the severed end of the corrugated ribbon 34 is then severed from its supply ribbon 32 is advanced through the welding unit 38 and to form an end as indicated at the top of Figure 1.

If it is desired to use the honeycomb structure thus formed in the form of a belt, this may be so done. If, however, it is desired to use the belt 30 in the form of a sheet, the belt 30 is removed from the unit shown in Figure 2 and severed transversely, preferably between the ends 32a and 34a at which the fabrication was started and the ends 32b and 34b at which the fabrication was terminated to provide a sheet of uniform width throughout its length.

It is apparent that more than two welding units may be provided and that multiple welding heads can be built in to a single machine to perform the welding operation of the plurality of welding units shown in Figure 2, all without departing from the present invention in its broader aspects.

In the embodiment of the invention illustrated in Figure 3, the honeycomb structure is fabricated in the form of a continuous sheet or strip 70. In this form of the invention, metallic ribbon is supplied through slits in a suitably apertured guide plate 72 from supply reels 74 to 84, through suitable degreasing units (not shown) to meshing pairs of corrugating rollers 86 to 96 respectively. The corrugated ribbons 98 to 103 formed by these roller pairs 86 to 96 are advanced between guide plates 106 and 108 past the welding heads of the successive welding units, those of which are illustrated being designated 110, 112 and 114. The corrugated ribbons 98 through 103 are advanced in such a manner that the adjacent faces of each adjacent pair of such ribbons are oppositely corrugated and so that the nodes are in abutment to define intermediate cells in the manner explained in detail in reference to Figure 1. The abutting nodes or ribbons 102 and 103 are bonded together by the welding unit 110; the abutting nodes of the ribbons 101 and 102 are bonded together by the welding unit 112; the abutting nodes of the ribbons 100 and 101 are bonded together by the welding unit 114; and the abutting nodes of ribbons 99 and 100 and 98 and 99 are bonded together by additional welding units (not shown) to form the continuous strip 70.

Figure 4 illustrates a further arrangement for fabricating sheets of honeycomb structure. In this arrangement, smooth ribbon is fed from supply reels 116a through h through suitable degreasing units, not shown, and through guide plate 118, which is suitably slit apertured, to the pairs of corrugating rolls 120a through h. The corrugated ribbons 122a through h are advanced in pairs to the welding units 124a through d in which respectively the abutting nodes of the oppositely corrugated adjacent faces of corrugated ribbons 122a and 122b are bonded together to form the strip 126; the abutting nodes of the oppositely corrugated adjacent faces of corrugated ribbons 122c and 122d are bonded together to form the strip 126b; the abutting nodes of the oppositely corrugated faces of the ribbons 122e and 122f are bonded together to form the strip 126c, and the abutting nodes of the oppositely corrugated adjacent faces of the corrugated ribbons 122g and 122h are bonded together to form the strip 126d. Strips 126a through d are advanced in juxtaposition through welding units 128, 130 and 132 which are effective respectively to bond together the abutting nodes of the oppositely corrugated adjacent faces of the strips 122f and 122g, of the strips 122d and 122e and 122b and 122c to form the wider strip 134. Strips 136, 138 and 140 are formed in the identical manner as has just been described for strip 134. Strips 134 through 140 are advanced through welding units 142, 144 and 146 which are effective respectively to bond the abutting nodes of the oppositely corrugated faces of the adjacent outside edge ribbons of strips 138 and 140, of strips 134 and 138 and of strips 136 and 134. In this manner a relatively wide sheet 148 is produced.

It is apparent from the foregoing that by this arrangement and by bonding successively wider sheets together, a honeycomb core structure of any desired width and length can be fabricated.

Referring to Figure 6, basically the welding unit of the present invention comprises a welding head 152 mounted for vertical reciprocation and a mechanism 154 operative to advance the corrugated strips and partially formed honeycomb core structure over horizontal work support surface 156 intermittently in timed relation to the reciprocal movement of the welding head 152. The path of movement of head 152 is parallel to the corrugations of the strips or ribbons. The welding head 152 is fixed to the lower end of a shaft 158 which is reciprocably mounted for movement along a vertical axis on a support 160 which is fixed to the free end of an overhanging arm structure 162 projecting horizontally from a hollow upstanding support column 164. As is best shown in Figure 5, column 164 is provided with a laterally projecting base flange 166 which is fixed by machine screws 168 to the plate 172. Support column 164 is formed by the welding together of a pair of opposed channel members 174 and 176 along their abutting edges at 178 and 180.

The overhanging arm structure 162 is of cylindrical tubular form having a centrally apertured end plate 182 welded thereto at 184. End plate 182 is fixed to the side face of column 164 by suitably spaced bolts (not shown). The opposite end of the overhanging arm 162 is externally of reduced diameter as indicated at 186 and is received within a piloting bore 188 in the adjacent face of a vertically depending support plate 190. The support 160 is fixed to the lower end of the front face 191 of the support plate 190 by suitable bolts, not shown. A bearing retainer member 192 is mounted internally of the overhanging support 162 in abutment with the end wall 193 of the bore 188 in support plate 190 and is provided with a hub 194 projecting coaxially through an aperture 196 through end wall 193 of bore 188 in plate 190. The main drive shaft 198 for the welding head 152 is journalled coaxially within the tubular overhanging support arm 162 by spaced bearings 200 and 202 mounted respectively in bearing retainer 192 and a bearing retainer 204 fixed to the wall of column 164 opposite that wall to which end plate 182 is fixed. Bearing 200 is retained within an end counterbored portion of the bore of bearing retainer 192 by an end cap 206 threadedly received on the end of the hub 194 of retainer 192. The end portion 208 of shaft 198 is of reduced diameter providing a shoulder 210 abutting the internal race of the bearing 200. A box cam 212 is received on the reduced end portion 208 of shaft 198 and is fixed for rotation therewith by a key 214 and axially thereof between a spacer 216 abutting the inner race of bearing 200 and box cam 212 by a nut 218 threaded on the end section 220 of shaft 198. Shaft 198 is driven from a motor driven power shaft 222 through a chain or timing belt 224 extending between pulley 226 fixed to shaft 222 and a pulley 228 fixed to shaft 198, belt 224 extending upwardly from pulley 226 through a suitable aperture 230 in support plate 172 and top plate 170 and through the column 164. The manner in which the drive shaft 222 is supported will be described hereinafter.

Cam 212 controls the vertical reciprocation of the shaft 158, shaft 158 being provided with an enlarged head 232 at its upper end upon which is clamped a cam follower support 234 journalling a cam follower roller 236 which rides in the groove 238 of the cam 212.

Referring now to Figures 6A and 6B, the welding head 152 comprises a body member 242 formed of a suitable insulating material and fixed to a sleeve 244 which is fixed to the lower end of the shaft 158. Pivoted within a bottom recess 246 of member 242 are two parallel similar pairs 247 and 248 of opposed electrodes. Electrodes 247 and 248 are held in a fixed position by screws 252, which clamp the electrodes to the sides of the slots 246, Figure 6B, and are adjusted for angular position by set screws 264, Figure 6A. This adjustment is made by dropping the electrodes into the cell so that the tips of the electrodes just touch the nodes of the core ribbon. The two opposing electrodes are pivoted on pin 254, Figure 6A, and are actuated by pressure adjusting screws 284 supported on spring 280 in turn, fastened to pivot bar 272 by screws 282. Pivot bar 272 pivots on pin 274 and carries a cam contact roller 276 at its upper end. The pivoted electrodes are opened by putting a piece of rubber 255 or insulated springs between the stationary electrodes at a point opposite the adjusting screw 264. Screws 252 act as terminals for welding cables. Current passes into one stationary electrode, flows through the node to its opposing electrode, then by a flexible copper shunt 257 (Figure 6C) to the adjacent pivoted electrode through the node to the other stationary electrode and out the opposite screw 252. The electrodes 249 and 250 are replaceable elements and are held in the open ends of the coaxial recesses 256 and 258 of holders 260 and 262 by set screws on the sides of holders 260 and 262. The set screws and the small nuts brazed to the sides of electrode pairs 247 and 248 are not shown. It is apparent from a study of Figure 6A that both sides of the electrode pairs could be actuated by a cam if so desired.

The pivotal movement of members 262 is controlled by an electrode opening and closing cam 266 fixed together with a weld timing cam 267 to the end flange 268 of a sleeve 270 coaxially received upon and rotatable relative to shaft 158. An actuating member 272, pivoted upon member 242 by a pivot pin 274, is provided with a rotatable cam follower 276 upon its reduced end portion 278 which engages the profile of the cam 266. At its lower end actuator 272 is provided with depending spring arm 280 fixed thereto by screws 282. At the lower end of spring arm 280, pressure adjusting screws 284 fixed thereto abuts the lower ends of the members 262. The configuration of the elements shown in Figure 6A is that assumed when the cam follower 276 is on the crest of the profile of the cam 266 and the electrodes 249 and 250 of both pairs 247 and 248 are closed, and thus constitutes the limit position of clockwise movement of actuator 272. The spacing between the tips of the electrode of pair 247 from pair 248 is equal to the spacing between adjacent nodes of the corrugated ribbons to be welded, that is equal to the width of each corrugation thereof.

When the welding head 152 has been lowered to its operative position, the adjacent tips of the electrodes 249 and 250 of pairs 247 and 248 are disposed on opposite sides of an adjacent pair of abutting nodes of the corrugated ribbons to be welded. When the welding head 152 has been lowered to a welding position, the cam 266 is effective to pivot actuator 272 to force electrodes 250 of both pairs 247 and 248 toward electrodes 249 so that both said electrodes embrace the adjacent pair of opposed nodes to be welded.

When the electrodes 249 and 250 have been so positioned, the profile of cam 267 actuates a push rod 286 to close the contacts of a switch assembly 288 to initiate current flow through an electronic welding timer between the electrodes 247 and 250. The exact cycle and timing relationship is shown in Figure 20. As is apparent from Figure 6B, the electrodes 249 and 250 of pair 247 are shorter than those of pair 248. Since the detailed operation will be explained more fully later, it will suffice at present to state that each abutting pair of nodes is spot welded in four spots, twice by pair 248 and twice by pair 247. (See Figures 18 and 19.) It is apparent that as many positions as desired may be cut on cams 266, 267 and 212 to give any desired number of spots and desired positions of the spots on the node. In addition, it can be seen that in the example given here, the machine could have each pair of electrodes put in four (4) spots in each node and then double index allowing two (2) nodes to be welded at one time instead of progressive welding.

Referring to Figure 7, sleeve 270 extends along shaft 158 to the enlarged head 232 thereof and is rotatably received in a bore 290 of member 160 and a coaxial bore 292 through the hub 294 of the plate member 296 secured to the bottom of the support member 160. A gear 298 is received between the upper end face of the hub 294 of member 296 and the end wall of the recess 300 in member 160 in which the hub 294 is received and a thrust roller bearing 302 is interposed between the upper end face of gear 298 and the end face of a reduced diameter recess 304 coaxial with bore 300. Gear 298 is provided with a key 306 which engages the axially extending keyway 308 in the periphery of sleeve 270 and a mating keyway in the bore of gear 298, being fixed relative to gear 298 between the adjacent faces of hub 294 and bearing 302. By this construction, sleeve 270 is free to move vertically with shaft 158 but is fixed for rotation with gear 298 independently of the shaft 158 which is non-rotatable due to the engagement of member 234 with the slot 309 in member 160. Gear 298 is driven from shaft 198 by a gear train formed by gear 310 (Figure 6) fixed to shaft 198 by a set screw 312, a gear 314 journalled by a roller bearing 316 upon a stub shaft 318 fixed to support plate 190 and in constant mesh with gear 310, a gear 320 constantly meshing with idler gear 314, a shaft 322 to which gear 320 is fixed by set screw 324 and which is journalled within member 160 by spaced bearings 326 and 328, and a helical gear 330 fixed to shaft 322 and in constant mesh with helical gear 298. By this gear train, therefore, the sleeve 270 is rotated in timed relation with the vertical reciprocation of shaft 158 to control the actuation of the electrodes 249 and 250. The helix angle of gears 298 and 330 is such that, during operation, upward thrust is imparted by gear 298 to antifraction thrust bearing 302.

The feed mechanism 154 is best illustrated in Figures 9 through 17. Referring first to Figure 9, the feed mechanism basically consists of a series of locating pins 350 mounted on and depending from a horizontal support plate 352 for vertical reciprocation therewith relative to the horizontal work support surface 156 above that surface and a series of index pins 354 mounted upon a horizontal support plate 356 which is mounted for movement in a rectangular path as indicated in Figure 9A. For convenience in description, the feed mechanism will be described as having four positions designated 1, 2, 3 and 4 in Figure 9A corresponding to the four limit positions of the path of movement of the index pins 354.

Figure 9 shows the configuration of the feed mechanism in position 1; Figure 12 the configuration of the feed mechanism at a position intermediate positions 1 and 2; Figure 13 the configuration of the feed mechanism at position 2; Figure 15, the configuration of the feed mechanism at position 3; and Figure 16 the configuration of the feed mechanism at position 4.

In position 1, the four indexing pins 354 are located immediately below the cells in the honeycomb core structure defined by the abutting corrugated strips as is most clearly shown in Figure 18. Points 358 and 360 represent the abutting nodes of the adjacently disposed corrugated strips at which welding is performed by electrode pairs 247 and 248 respectively (Figure 6B). The corrugated ribbon 362 which is to be attached to the previously formed honeycomb core structure 364 is fed along a guide surface 366 (Figure 10) of a guide member 368 beside the preformed portion of the honeycomb structure 364. The pair of pins 354 at the left as viewed in Figure 18 feed the previously formed honeycomb portion 364 and the ribbon 362 which has just been bonded to the portion 364 at positions 358 and 360 and the pair of pins 354 at the right as viewed in Figure 18, in conjunction with spring clips 526 and 528, support, guide and properly align the corrugations of the strip 362 relative to the corrugations of the outside strip 370 of the previously formed honeycomb core portion 364.

In moving between positions 1 and 2, the pins 354 are lifted to extend into the cells defined between the abutting nodes of the corrugated honeycomb core structure as is shown in Figure 12 and finally to upper position 2 shown in Figure 13, simultaneously wire clips 528 are clamping the nodes between pins 354. Once the pins 354 reach position 2, they are moved to the left as viewed in Figures 2, 12, 13, 15 and 16 from the position shown in Figure 13 to the position shown in Figure 15. During this movement the locating pins 350 have been lifted above the honeycomb structure and are disengaged therefrom. In this leftward movement of the indexing pins 354, the honeycomb core structure 364 and the corrugated ribbon 362 are advanced to the left a distance equal to the spacing between adjacent corrugations of the strip 362 or considered another way the width of one of the cells in the honeycomb core structure 364. Once the indexing pins 354 reach position 3, as shown in Figure 15, they are lowered to the position 4 shown in Figure 16 to disengage the core structure 364 and locating pins 350 are simultaneously lowered into engagement with the honeycomb core 364 to hold that structure.

At this point, it is important to note that as the pins 354 are dropping, pins 350 are entering the cell and that wire clips 534 are picking up the clamping action of clips 528 and that these clips always hold the cell clamped around pins 350 or 354 at all times during the transfer of indexing pins for locating pins in this part of the cycle. The right hand pin 350 is bullet nosed and as pins 350 move from position #3 to #4, Figure 9A, this right hand pin and wire clips align the next incoming cell for the right hand pin in the lower indexing pins to pick up for the first time. From here, this cell is held in position through the indexing device and welding stations at all times and is at no time allowed freedom of movement except as controlled by the machine.

There are four spring loaded pins located 351 in plate 352 as marked on Figure 10A. These pins 351 extend below the plate 352 about 1/16 of an inch in such a manner that they contact the top of the thin spring steel stripper plate 378, Figure 12A, at the bottom of travel of plate 352 as it moves into position (4), Figure 9A. Contact is made at about the points marked 353 on Figure 12A. It is apparent that the core is resting on the top surface 156 of cover plate and under bottom surface of spring steel stripper plate 378. Stripper plate 378 is mounted in such a manner that it springs up slightly during indexing to allow clearance for the core to slide during indexing. When plate 352 reaches bottom position (4) for welding, the spring loaded pins 351 force the spring steel stripper plate down, thus clamping the core between its bottom surface and surface 156. It is apparent, that the top and bottom edges of ribbons 362 and 370 are forced in to alignment at the point 360, Figure 18, and held until the welding is complete.

After being completely disengaged from the core structure 364 upon movement to position 4 as shown in Figure 16, the indexing pins 354 are moved to the right as viewed in Figure 16 to the initial position 1 as shown in Figure 9. This cycle of operation is repeated continuously in timed relation to the reciprocal movement of the welding head 152 shown in Figure 6. The exact timing relationship of movement of the welding head 152 and the feed mechanism 154 is shown in detail in Figure 20. It will suffice to point out that the welding electrodes 249 and 250 of pairs 247 and 248 (Figures 6A and B) are clear of the honeycomb core structure 364 during its movement with the indexing pins 354 from positions 2 and 3 and are lowered into welding positions and the welding operation takes place. During welding the feed pins are returned to position one and dwell until the welding is complete; then move from position one to position two.

Referring again to Figure 9, the plate 352, upon which the locating pins 350 are mounted, is fixed to a vertically reciprocable cross head 372 which is mounted between and fixed to a pair of vertically extending vertically reciprocable shafts 374 and 376. The mounting of the shafts 374 and 376 is identical, the mounting of shaft 376 being illustrated in detail in Figure 11.

As is shown in Figure 11, below crosshead 372 the shaft 376 extends downwardly through the aperture 382 in guide bore 368, through cover plate 170 into bearing 386 supported by 172 and support plate 390. Then the reduced diameter 404 of shaft 376 passes through bore 406 of lug 408 and is held in position by a nut 410. A parallel shaft 392 is received at its upper end within apertures 394 and 396 in plates 172 and 390 respectively and fixed therein. A hub 398, which retains an anti-friction bearing 400 within an internal recess 402 thereof, is mounted for vertical reciprocation along shaft 392.

Shaft 374 at the left end of the feed mechanism as viewed in Figure 9, is similarly mounted in a bearing 412 and fixed to a hub 414 by a nut 416 and hub 414 is similarly mounted upon a vertical shaft 418 fixed to plate 172 and reinforcing plate 420 in a manner identical with the mounting of shaft 392 as shown in Figure 11. As is shown in Figure 9, hubs 398 and 414 are in vertical alignment and rigidly interconnected by a cross bar 422. Hubs 398 and 414 and cross bar 422 are in practice formed together as a single integral member.

The details in construction of the cross bar 422 are best illustrated in Figures 13 and 14. Cross bar 422 is formed in the general shape of an I-beam having a vertically extending web 424 interconnecting a top guide rail 426 of rectangular cross section and a lower guide rail 428 also of rectangular cross section. Members 424, 426 and 428 are rigidly interconnected and extend between the hubs 398 and 414 as is shown in Figure 13. The cross bar 422 is surrounded by a saddle structure 430 upon the top of which is mounted the support plate 356 for the indexing pins 354. Saddle structure 430 is formed by an inverted U-shaped deep channel member 432 and a bottom member 434 having a transverse web interconnecting upstanding side walls 436 and 438. Channel shaped members 440 and 442, which are nylon bearings, are fixed within the rectangular longitudinally extending aperture 444 defined by the assembly of members 432 and 434 and embrace and are slidably received upon the ground and polished guide ways 426 and 428 respectively. Members 440 and 442 are coextensive in length with members 432 and 444 and are fixed thereto. The saddle assembly 430 is thus formed by members 432, 440, 434, 442 and 356, and is slidable along the cross bar 422 as a unit.

Referring again to Figure 9, the main support plate 172 is supported upon side plates 450 and 452 which in turn are fixed to a bottom support plate 454 which is parallel to the support plate 172.

The control of the vertical positioning of the cross bar 422 and the saddle structure 430 will now be explained in reference to Figure 6. This vertical positioning of cross bar 422 and saddle assembly 430 is controlled by a box cam 456 which is fixed to a vertical shaft 458 that is journalled by spaced bearings 460 and 462 on opposite sides of the bottom support plate 454. Bearing 460 is received within an annular ring 464 welded to the upper surface of plate 454 and bearing 462 is similarly retained by a ring 466 welded to the lower surface of plate 454. Bearings 460 and 462 are thrust type antifriction bearings. Shaft 458 is provided with a reduced upper end section 468 upon which the cam 456 is received together with a further cam 470, the purpose of which will be explained presently, and fixed to that reduced portion 468 by a key 472 and a nut 474 threaded upon the end of section 468 of shaft 458. The peripheral cam groove 476 of cam 456 receives a follower roller 478 journalled upon a stud shaft 480 fixed to and extending horizontally perpendicular from the web 424 of cross bar 422 through a laterally elongated aperture 482 in the rear of the U-shaped member 432 of the laterally displaceable saddle assembly 430. Aperture 482 is of elongated shape (see Figure 13) so that the saddle assembly 430 is free to move longitudinally of the cross bar 422 between the lateral limit positions of its movement.

Cam 456 is rotated with shaft 458 in timed relationship with the vertical reciprocation of the welding head 152 by a gear train formed by gear 484 (Figures 6 and 8) fixed to the end of shaft 222, the motor driven power shaft, a gear 486 in constant mesh with gear 484, a shaft 488 to the end of which gear 486 is fixed and which is journalled by bearings 490 and 492 in a pillow block 494 fixed to the bottom of plate 454, a helical gear 496 fixed to the opposite end of shaft 488, a helical gear 498 in constant mesh with gear 496 and fixed to the lower end of a shaft 458 by nut 500 and key 502.

The rotation of box cam 456 thus effects vertical reciprocation of the locating pins 350 and the indexing pins 354 without constraining the lateral movement of pins 354.

The lateral reciprocation of saddle assembly 430 along the cross bar 422 is controlled by the cam 470, which is a box cam havnig a cam groove 504 formed in the bottom face thereof, through a pivotable slidable lever 506 (Figure 8) and pin 508 (Figures 6 and 8) engaging an elongated slot 510 (Figure 8) in lever 506 and fixed to the web portion of member 434 of saddle 430 (Figure 6). As is best shown in Figure 8, lever 506 is pivotally mounted upon a stud 512 that is slidably received in an elongated slot 514 in the plate 454, lever 506 resting upon and slidable over the top surface of plate 454. Midway of its length, lever 506 is formed with an elongated slot 516 which receives a roller 518 which is mounted upon plate 454 for longitudinal displacement in an elongated slot 520 formed in plate 454. The position of roller 518 in slot 520 is controlled by the cam groove 504 of cam 470 (Figure 6) which receives the upper portion of roller 518 (Figure 8). Pin 508 is sufficiently long to remain in engagement with the elongated slot 510 of the lever 506 when the cross bar 422 is raised to its upper limit position (positions 2 and 3). A groove 522 (Figure 6) is formed through the plate 454 along the path of movement of the pin 508 so that the pin 508 may move freely through slot 522 when saddle 430 is moved along cross bar 422 when it is in its lower limit positions 4 and 1.

Thus, referring again to Figure 8, when the feed mechanism is in positions 1 and 2, the roller 518 is received within a dwell of cam 470 which maintains roller 518 at a uniform distance remote from the axis of shaft 458 and when the feed mechanism is in positions 3 to 4 the cam 470 provides a dwell closely adjacent the axis of shaft 458 for the roller 518 and the roller 518 is moved between these two limit positions, being moved toward the axis of shaft 458 between positions 2 and 3 and away from the axis of shaft 458 between positions 4 and 1. This movement of the roller 518 produces concomitant pivotal movement of the lever 506 and lateral displacement of the pin 508 and the saddle assembly 430 to which it is fixed.

From the foregoing discussion, it is apparent that through rotation of shaft 458 (Figure 6), the indexing pins 354 are moved sequentially through the four positions shown diagrammatically in Figure 9A and that the locating pins 350 are lifted with the movement of the cross bar 422 to disengage the honeycomb core structure 364 to permit movement of the structure 364 by the indexing pins 354 in steps across the work support surface 156.

In order to further confine the movement and support to corrugated strip 362 (Figure 10) relative to the corrugated strip 370 to which it is to be attached, a series of spring fingers are provided to lightly clamp the abutting nodes of strip 362 and strip 370 together at the two positions immediately before the abutting nodes reach the initial welding position at 360. These fingers, as best shown in Figures 13 and 14, comprise a pair of spring wires 526 and 528 fixed to the plate 356 and the member 432 of the saddle 430 and projecting upwardly between the right pair of pins 354 as is shown in Figure 13. Immediately above spring fingers 528 and 526 at position 2 of the feed mechanism shown in Figures 13 and 14 a pair of spring fingers 530 and 532 fixed to the plate 352 intermediate the middle and right side locating pin 350 of the group of three locating pins 350 at the right of the rear row of the locating pins and a further pair of pins 534 and 536 is provided immediately above pins 526 and 528 when the feed mechanism is in its number 3 position as is shown in Figures 16 and 17.

As has been previously indicated, there are two pairs of electrodes 247 and 248 (Figure 6B) forming part of the welding head 152. Referring to Figure 18, the pairs of electrodes are spaced in the direction of feed of the honeycomb core structure 364 the length of one corrugation of the strip 362, pair 247 being located to embrace strips 362 and 370 at 358 and pair 248 being located to simultaneously embrace the strips 362 and 370 at 360. In this form of the invention, the strips 362 and 370 are joined by spot welding. Referring to Figure 19, as the welding head 152 is lowered under the control of the box cam 212 (Figure 6), its movement is arrested and welding performed at two points in its path of movement. At the first position (electrode position No. 1 in Figure 20) in which the electrodes are stopped and welding performed, the pair of electrodes 247 weld at a point 358-1 (Figure 19) and pair 248 weld at a point 360-1 vertically off-set relative to the position 358-1. At the bottom of the path of movement of the welding head 152 (electrode position No. 2 in Figure 20), pair 248 is moved to weld at position 360-2 adjacent the bottom of the strips 362 and 370 and electrode pair 247 is moved down to weld at a position 358-2 intermediate positions 360-1 and 360-2. Since the strips 362 and 370 are advanced in steps a distance equal to the width of one corrugation, that is the distance between 358 and 360, during each cycle of the feeding mechanism, it is apparent that each abutting pair of nodes of strips 362 and 370 are spot welded together at four positions along the length of each node. The abutting nodes are first welded at position 360 at points 360-1 and 360-2 and at positions 358 at points 358-1 and 358-2.

The timed inter-relation of the actuation of the welding electrode head 152 and the feed mechanism 154 and its components are shown in detail in the timing diagram, Figure 20. This diagram when read in conjunction with the foregoing description is believed to be self-explanatory of the timing of operation of the several components.

It is apparent from the above description that any even number of spots may be placed in a node either from the top to bottom or bottom to top by the addition of more welding stations in the electrode cam 266 and initiation switch cam 267 as shown in Figure 20.

If desired, roll welding may be substituted for spot welding in the apparatus of the present invention. Figures 21 and 22 illustrate the modified structure necessary for use in roll welding and Figure 23 illustrates the timing diagram of the welding unit of the present invention as modified for roll welding. For this purpose a welding roller 550 is journalled upon a lever 552 at 554. Lever 552 is pivoted at 556 upon a suitable support 558 and has upwardly extending arms 560 provided with a cam roller 562 on the upper end thereof engaging the profile of cam 564. Support 558 is fixed to the lower end of shaft 158 and cam 564 is fixed with a weld initiation cam 565 to the flange 268 on sleeve 270 in a manner similar to the mounting of the welding head and cams 266 and 267 as shown in Figures 6 and 6A. A second electrode 566, which may be a fixed electrode as shown in Figure 21 or a second opposed roller electrode, is mounted by a non-conductive support 567 on the locating pin support 352. Electrode 566 has a depending portion 568 in alignment with the path of movement of the roller 550. The electrode 566 is fastened to upper pin plate 352 and insulated therefrom in such a manner by support 567 that the edge is in alignment with the path of travel of rollweld wheel 550, Figure 21. The hole 569 in the plate 352, which allows rollweld wheel 550 and arm 552 to pass through plate 352 is cut to just allow clearance for this assembly and the hole cuts up to the edge of pin 566 to allow roller 550 to roll from the position above plate 352 on pin 568 through the hole 569 in plate 352 staying in contact with electrode 566, then engaging the nodes of the cell to be welded and travelling to the bottom of the node supported by copper pin electrode 566 making a weld which is initiated by cam 565, then rolling back up the node through the hole 569 in plate 352 to the upper end of pin 566. Pins 350, plate 352 (Figure 15), and assembly 550, 552, and 558 are lifted to disengage core in timed relation to each other to allow the indexing of the core.

While the structure described above is satisfactory, in the preferred form, a permanent spring of loading wheel 550 against electrode 566 by interposing a compression between arms 552 and the support 558 adjacent the point of attachment of the electrical lead as shown in Figure 21 with permanent loading spring on 550, welding can continue in both directions up and down of the rollweld wheel 550 to insure a good weld in the node.

From the foregoing description it is apparent that the honeycomb core structure which can be built up by the apparatus and methods herein disclosed can become extremely wide. In this event it becomes necessary to provide a feed mechanism which eliminates the frictional drag of the honeycomb core structure 364 previously formed upon the work support surface 156 if distortion of the structure 364 is to be avoided. For this purpose I have provided an extension of the feed mechanism which is shown in exploded form in Figure 24 wherein parts corresponding to the previously described mechanism have been assigned like reference numerals. For this purpose I have provided a laterally extending support arm 580 from the saddle 430 upon the cross rod 422 and an integral extension 582 for the plate 356. Mounted on extension 382 are a series of friction pads 584 which may be brushes or sponge rubber pads to engage the honeycomb structure without damage thereto and which project upwardly through aligned elongated apertures 586 formed through the plate 170 and 172 of the table structure to engage the bottom of the previously formed honeycomb core structure 364. In order to properly confine the previously formed honyecomb core structure I provide a guide plate 588 mounted from a suitable support 590 upon the work support surface 156 to hold the previously formed honeycomb core structure 364 down against the work support surface 156. The relation of this form of feed mechanism to the welding unit is illustrated in Figure 2 in connection with welding unit 36.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device for fabricating a honeycomb structure from transversely corrugated ribbon comprising means for assembling transversely corrugated ribbon in the form of a cellular honeycomb of adjacently disposed oppositely corrugated ribbon sections and means operative during such assembly for bonding the nodes of adjacent ribbon sections together to form a unitary honeycomb structure.

2. A device for fabricating a honeycomb structure from ribbon comprising means for transversely corrugating such ribbon, means for assembling the corrugated ribbon produced by said ribbon corrugating means in the form of a cellular honeycomb of adjacently disposed oppositely corrugated ribbon sections, and means operative during such assembly for bonding the nodes of adjacent ribbon sections together to form a unitary honeycomb structure.

3. A device for fabricating a honeycomb structure from transversely corrugated ribbon comprisng means for advancing a first corrugated ribbon section along a predetermined path and means operative at one point in the path of said first ribbon section to bond the nodes on one side of said ribbon section to abutting nodes of a second and oppositely corrugated ribbon section and at a second point in said path to bond the nodes of the opopsite side of said first ribbon section to abutting nodes of a third and oppositely corrugated ribbon section.

4. A device for fabricating an all metal honeycomb structure from metallic ribbon comprising means for transversely corrugating such metallic ribbon, means for assembling the corrugated ribbon output from said ribbon corrugating means on edge in the form of a cellular honeycomb of adjacently disposed oppositely corrugated ribbon sections, and means operative during such assembly for fusing the nodes of adjacent ribbon sections together to form a unitary metallic honeycomb structure.

5. A device for fabricating an all metal honeycomb core structure from transversely corrugated ribbon comprising means for advancing a first corrugated metal ribbon section along a predetermined path, at least one source of corrugated ribbon supplying corrugated ribbon to said advancing means, means operative at one point in said path to weld the nodes of one side of said first ribbon section to abutting portions of a second and oppositely corrugated ribbon section and at a second point in said path to bond the nodes of the opposite side of said first ribbon section to the nodes of a third and oppositely corrugated ribbon section.

6. The device defined in claim 5 wherein said welding means comprises a number of welding tools equal in number to the number of sources of ribbon each mounted for cyclical movement longitudinally of the corrugations of said strip sections between an inoperative position remote from the path of movement of said strip sections and an operative position in the path of movement of said strips.

7. The device defined in claim 5 wherein said ribbon section advancing means is so constructed as to move said ribbon sections along a generally helicoid-like path whereby said honeycomb structure is initially formed in the form of a loop.

8. The device defined in claim 5 wherein said ribbon section advancing means is so constructed as to advance such ribbon sections along a generally planar path whereby said honeycomb structure is initially fabricated in the form of a sheet.

9. A method of fabricating honeycomb core comprising the steps of moving a transversely corrugated first ribbon along a predetermined path, simultaneousy moving a second similarly corrugated ribbon in an adjacent path with the nodes thereof abutting the nodes of the adjacent side of said first ribbon, and bonding each abutting pair of nodes of said ribbons together when moved to predetermined positions in the paths of movement of said ribbons.

10. The method defined in claim 9, wherein the bonding is performed by electrical resistance welding.

11. In a method of fabricating all metal honeycomb core from corrugated ribbon, the steps of moving an oppositely corrugated pair of metal ribbons in intermittent steps through a work station; moving a bonding tool longitudinally of the corrugations of said ribbons to a position to engage a pair of abutting nodes of said ribbons located at said work station, actuating said bonding tool to bond said abutting nodes together, and removing said bonding tool from the path of movement of said ribbons while said ribbons are stationary.

12. In an all metal honeycomb core fabricating machine, a work station, a feed mechanism for supporting an oppositely corrugated pair of transversely corrugated metal ribbons in juxtaposition at said work station with the nodes thereof in abutment and for intermittently advancing said ribbons longitudinally through said work station a distance equal to a whole number multiple of the spacing between said corrugations, and means at said work station cyclically operative in timed relation to the movement of said strips to bond said abutting nodes together.

13. The machine defined in claim 12 wherein said bonding means comprises a bonding tool, means mounting said bonding tool for reciprocation between an operative position in engagement with a pair of abutting nodes of such ribbons and an inoperative position remote from the path of movement of said ribbons, and means operative in timed relation with said ribbon advancing means to reciprocate said bonding tool between its operative and inoperative positions.

14. The machine defined in claim 13, wherein said bonding tool is an electrical resistance welding head.

15. The machine defined in claim 14, wherein said welding head comprises at least one pair of pivotally mounted electrodes adapted to engage such abutting nodes on opposite sides and means operative while said welding head is in its operative position to move said electrodes into engagement with the opposite sides of the aligned abutting nodes, and means for energizing said electrodes.

16. The machine defined in claim 15 wherein said reciprocating means is so constructed as to advance said electrodes along the engaged nodes in steps and wherein said electrodes are energized at each such steps.

17. The machine defined in claim 14 wherein said welding head comprises a pair of electrodes at least one of which is a roller and means for energizing said electrodes when in operative position and wherein said bonding tool reciprocating means is operative to advance said roller electrode along the engaged node while energized.

18. The machine defined in claim 12 wherein said feed mechanism comprises a work support surface along which the ribbons are to be advanced, a locating pin, an indexing pin, means for moving said pins into position to engage a cell defined by said ribbons on said surface alternately, and means operative while said indexing pins are in ribbon engaging position to shift said indexing pin a predetermined distance in the direction of ribbon movement over said surface and while said indexing pin is positioned remote from its ribbon engaging position to restore it to its initial position relative to the path of ribbon movement.

19. The machine defined in claim 12 wherein said feed mechanism comprises a work support surface along which said ribbons are to be advanced, a plurality of locating pins adapted when in operative position to be received within certain of the cells defined by said ribbons, a plurality of indexing pins adapted when in operative position to be received within certain of such cells, means for moving said locating and said indexing pins into operative positions alternately, and means operative while said indexing pins are in operative position to shift said indexing pins a predetermined distance longitudinally of the path of ribbon movement in the direction of intended movement of such ribbons to so move such ribbons and while said indexing pins are not in operative position to restore said indexing pins to their initial position.

20. The combination defined in claim 19 wherein said pin moving means comprises a pair of supports mounted on opposite sides of the path of movement of said ribbons along said surfaces in fixed relative spatial relation, said locating pins being mounted on one of said supports and said indexing pins being mounted on the other, and means for conjointly reciprocating said supports in a direction normal to the path of ribbon movement to move said indexing and locating pins into their operative positions alternately.

21. The combination defined in claim 19 wherein said index pin shifting means comprises a support mounted for reciprocation longitudinally of the path of ribbon movement and means operative to move said support in one direction while said indexing pins are in operative position and in the opposite direction while said pins are not in operative position.

22. The combination defined in claim 19 wherein said pin moving means comprises a pair of supports mounted on opposite sides of the path of movement of said ribbons along said surface in fixed relative spatial relation, said locating pins being mounted on one of said supports and said indexing pins being mounted on the other, means for conjointly reciprocating said supports in a direction normal to the path of ribbon movement to move said indexing and locating pins into their operative positions alternately, and said index pin shifting means comprising means mounting said indexing pin support for reciprocation longitudinally of the path of ribbon movement and means operative to move said index pin support in one direction while said index pins are in operative position and in the opposite direction while said pins are not in operative position.

23. In the honeycomb core fabricating machine defined in claim 12, said feed mechanism comprising a plurality of pins adapted to be received within the cells defined by said ribbons at each side of said work station, and means for moving said pins to intermittently advance said ribbon through said work station.

24. In the honeycomb core fabricating machine defined in claim 12, said feed mechanism comprising a plurality of pins adapted to be received within the cells defined by said ribbons at each side of said work station, means for moving said pins to intermittently advance such ribbons through said work station, and means for holding said abutting nodes in abutment prior to passage through said work station.

25. A device for producing a honeycomb core comprising means defining a work station, means for supporting and feeding intermittently a pair of oppositely corrugated strips along a predetermined path in juxtaposition to said work station, a bonding tool, means mounting said bonding tool at said work station for intermittent movement between an inoperative position remote from said path and an operative position in engagement with the non-adjacent faces of said strips at their region of contact in timed relation with the movement of said feeding means, and actuating means operative while said bonding tool is in its operative position to actuate said bonding tool to bond together said abutting portions of said strips.

26. In a honeycomb core fabricating machine, a work support surface along which the honeycomb core is to be advanced, a locating pin, an indexing pin, means for moving said pins into position to engage a core on said surface alternately, and means operative while said indexing pin is in core engaging position to shift said indexing pin a predetermined distance in the direction of core movement over said surface and while said indexing pin is positioned remote from its core engaging position to restore it to its initial position relative to the path of core movement.

27. In a honeycomb core fabricating machine, a work support surface along which an oppositely corrugated pair of transversely corrugated ribbons are to be advanced longitudinally on edge by intermittent movement in juxtaposed relation with the nodes of their adjacent faces in abutment to permit bonding together of said abutting nodes to define a series of hollow cells one between each adjacent pair of said abutting nodes, a plurality of locating pins adapted when in operative position to be received within certain of such cells, a plurality of indexing pins adapted when in operative position to be received within certain of such cells, means for moving said locating and said indexing pins into operative positions alternately, and means operative while said indexing pins are in operative position to shift said indexing pins a predetermined distance longitudinally of the path of ribbon movement in the direction of intended movement of such ribbons to so move such ribbons and while said indexing pins are not in operative position to restore said indexing pins to their initial position.

28. The combination defined in claim 27 wherein said pin moving means comprises a pair of supports mounted on opposite sides of the path of movement of said ribbons along said surfaces in fixed relative spatial relation, said locating pins being mounted on one of said supports and said indexing pins being mounted on the other, and means for conjointly reciprocating said supports in a direction normal to the path of ribbon movement to move said indexing and locating pins into their operative positions alternately.

29. The combination defined in claim 27 wherein said index pin shifting means comprises a support mounted for reciprocation longitudinally of the path of ribbon movement and means operative to move said support in one direction while said indexing pins are in operative position and in the opposite direction while said indexing pins are not in operative position.

30. The combination defined in claim 27 wherein said pin moving means comprises a pair of supports mounted on opposite sides of the path of movement of said ribbons along said surface in fixed relative spatial relation, said locating pins being mounted on one of said supports and said indexing pins being mounted on the other, means for conjointly reciprocating said supports in a direction normal to the path of ribbon movement to move said indexing and locating pins into their operative positions alternatively, and said index pin shifting means comprising means mounting said indexing pin support for reciprocation longitudinally of the path of ribbon movement and means operative to move index pin support in one direction while said index pins are in operative position and in the opposite direction while said pins are not in operative position.

31. In a honeycomb core fabricating machine, a work support surface along which a pair of oppositely corrugated ribbons are to be advanced longitudinally on edge through a work station by intermittent movement in juxtaposed relation with the nodes of their adjacent faces in abutment to permit bonding together of such abutting nodes at such work station to define a series of hollow cells one between each adjacent pair of such abutting nodes, a plurality of locating pins adapted when in operative position to be received within certain of such cells on each side of said work station, a support for said locating pins, a plurality of indexing pins adapted when in operative position to be received within certain of such cells on each side of said work station, a support for said indexing pins, means for moving said supports conjointly to move said locating and said indexing pins into operative position alternately, and means operative while said indexing pins are in operative position to shift said index pin support a predetermined distance longitudinally of and in the direction of intended movement of such ribbons to so move such ribbons and while said indexing pins are not in operative position to restore said index pin support to its initial position.

32. The combination defined in claim 31 together with means interposed between each adjacent pair of pins located to engage said ribbons prior to their movement into said work station for clamping said abutting nodes together.

33. In a honeycomb core fabricating machine, a feed mechanism for intermittently longitudinally advancing an oppositely corrugated pair of transversely corrugated ribbons in juxtaposed relation through a work station with the nodes of their adjacent faces in abutment to permit bonding together of such abutting nodes at such work station to define a series of hollow cells one between each adjacent pair of said abutting nodes, said mechanism comprising a plurality of pins adapted to be received within said cells at each side of said work station, and means for moving said pins to intermittently advance said ribbon through said work station.

34. In a honeycomb core fabricating machine, a feed mechanism for intermittently longitudinally advancing an oppositely corrugated pair of transversely corrugated ribbons in juxtaposition through a work station with the nodes of their adjacent faces in abutment to permit bonding together of such abutting nodes at such work station to define a series of hollow cells one between each adjacent pair of said abutting nodes, such mechanism comprising a plurality of pins adapted to be received within such cells at each side of said work station, means for moving said pins to intermittently advance such ribbons through said work station, and means for holding said abutting nodes in abutment prior to passage through said work station.

35. In combination, a work station, means for supporting an oppositely corrugated pair of transversely corrugated metallic ribbon sections in juxtaposition at said work station with the nodes thereof in abutment, means for advancing said strips through said work station in the direction transverse to the corrugations a distance equal to a whole number multiple of the spacing between adjacent corrugations, means at said work station intermittently operative in timed relation to the movement of said strips to weld said strip portions together including a pair of electrodes mounted for cyclical movement longitudinally of the corrugations of said strips between an inoperative position remote from the path of movement of said strip and an operative position embracing said abutting strip portions, and means cyclically operative to energize said electrodes when in said operative position to bond said abutting strip portions together.

36. A device for fabricating a honeycomb core structure comprising means for assembling a plurality of corrugated metallic ribbons together to form a honeycomb strip in which adjacent pairs of ribbons are oppositely corrugated and bonded together at abutting nodes, and means for assembling a plurality of corrugated strips having oppositely corrugated adjacent edge ribbons and bonding said edge ribbons together at abutting nodes to form a honeycomb core segment.

37. In an all metal honeycomb core fabricating machine, a work station, feed mechanism for supporting an oppositely corrugated pair of transversely corrugated metal ribbons on edge in juxtaposition at said work station with the nodes thereof in abutment and for intermittently advancing said ribbons longitudinally through said work station a distance equal to an even multiple of the spacing between said corrugations; means at said work station cyclically operative in timed relation to the intermittent movement of said strips to bond said abutting nodes together comprising an electrical resistance welding head having a pair of opposed roller electrodes, means mounting said welding head for reciprocation between an operative position in engagement with a pair of abutting nodes of such ribbons and an inoperative position remote from the path of movement of said ribbons, and means operative in timed relation with said ribbon advancing means to reciprocate said welding head between its operative and inoperative positions, and means for energizing said electrodes when in operative position, said welding head reciprocating means being operative to advance said roller electrodes along the engaged nodes while said electrodes are energized.

38. In combination with a work support surface, a feed mechanism for intermittently moving a honeycomb core over said support surface comprising core locating means, core indexing means, means for moving said locating and indexing means into position to operatively engage a core on said surface alternately, and means operative while said indexing means is in core engaging position to shift said indexing means a predetermined distance in the direction of core movement over said surface and while said indexing means is positioned remote from its core engaging position to restore it to its initial position relative to the path of core movement.

39. In combination with a work support surface, a feed mechanism for intermittently moving a honeycomb core over said support surface comprising core locating means operative to prevent inadvertent core movement, core indexing means, means for moving said indexing means alternately between a first position operatively engaging a core on said surface and a second position remote from said first position, and means operative while said indexing means is in said first position to shift said indexing means a predetermined distance in the direction of core movement over said surface and while said indexing means is in said second position to restore it to its initial position relative to the path of core movement.

40. The combination defined in claim 39 wherein said indexing means comprises a member adapted when in said first position to enter a cell of said core.

41. A device for producing a cellular structure comprising means defining a work station, means for supporting and feeding intermittently a pair of oppositely corrugated strips along a predetermined path in juxtaposition to said work station, a bonding tool, means mounting said bonding tool at said work station for intermittent movement between an inoperative position remote from said path and an operative position in engagement with a face of each of said strips at their region of contact in timed relation with the movement of said feeding means, and actuating means operative while said bonding tool is in its operative position to actuate said bonding tool to bond together said abutting portions of said strips.

42. A feed mechanism comprising means for intermittently longitudinally advancing an oppositely corrugated pair of transversely corrugated ribbons in juxtaposed relation through a work station with the nodes of their adjacent faces in abutment to define a series of hollow cells one between each adjacent pair of said abutting nodes, said means including a plurality of pins adapted to be received within said cells, at least one of said pins being located at the inlet and at least one at the outlet side of said work station, and means for moving said pins to intermittently advance said ribbons through said work station.

43. In a honeycomb core fabricating machine, a work station, a feed mechanism for supporting an oppositely corrugated pair of transversely corrugated ribbons on edge in juxtaposition at said work station with the nodes thereof in abutment and for intermittently advancing said ribbons longitudinally through said work station a distance equal to a whole number multiple of the spacing between said corrugations, and means at said work station cyclically operative in timed relation to the movement of said strips to bond said abutting nodes together.

References Cited in the file of this patent

UNITED STATES PATENTS

| | | |
|---|---|---|
| 853,241 | Helberger | May 14, 1907 |
| 1,074,383 | Rietzel | Sept. 30, 1913 |
| 1,826,207 | Fassler | Oct. 6, 1931 |
| 1,850,454 | Gross | Mar. 22, 1932 |
| 1,869,804 | Eksergian | Aug. 2, 1932 |
| 2,163,590 | Ganahl et al. | June 27, 1939 |
| 2,423,870 | Blessing | July 15, 1947 |

FOREIGN PATENTS

| | | |
|---|---|---|
| 825,327 | France | Dec. 8, 1937 |

UNITED STATES PATENT OFFICE
CERTIFICATE OF CORRECTION

Patent No. 2,843,722  July 15, 1958

Milton G. Wegeforth

It is hereby certified that error appears in the printed specification of the above numbered patent requiring correction and that the said Letters Patent should read as corrected below.

Column 4, line 73, strike out "the corrugated ribbon 34 is then severed from its supply" and insert the same after "unit 38 and", in line 74, same column; column 8, line 16, for "grear" read -- gear --; column 11, line 29, for "havnig" read -- having --; column 13, line 58, for "honyecomb" read -- honeycomb --; column 14, line 26, for "opopsite" read -- opposite --; line 70, for "simultaneousy" read -- simultaneously --; line 71, for "similary" read -- similarly --.

Signed and sealed this 16th day of September 1958.

(SEAL)
Attest:

KARL H. AXLINE

Attesting Officer

ROBERT C. WATSON
Commissioner of Patents